US005796992A

United States Patent [19]

Reif et al.

[11] Patent Number: 5,796,992
[45] Date of Patent: Aug. 18, 1998

[54] CIRCUIT FOR SWITCHING BETWEEN SYNCHRONOUS AND ASYNCHRONOUS MEMORY REFRESH CYCLES IN LOW POWER MODE

[75] Inventors: James R. Reif, Houston; Michael J. Collins, Tomball; Todd J. DeSchepper, Houston, all of Tex.

[73] Assignee: Compaq Computer Corporation, Houston, Tex.

[21] Appl. No.: 575,370

[22] Filed: Dec. 20, 1995

[51] Int. Cl.$^6$ ................................................. G06F 1/04
[52] U.S. Cl. ........................................ 395/555; 395/559
[58] Field of Search ................................. 395/555, 556, 395/559, 560, 750.04, 427

[56] References Cited

U.S. PATENT DOCUMENTS

| | | | |
|---|---|---|---|
| 4,980,836 | 12/1990 | Carter et al. | 364/483 |
| 5,241,680 | 8/1993 | Cole et al. | 395/750 |
| 5,615,376 | 3/1997 | Ranganathan | 395/750 |
| 5,625,807 | 4/1997 | Lee et al. | 395/560 |

*Primary Examiner*—Dennis M. Butler
*Attorney, Agent, or Firm*—Pravel, Hewitt, Kimball & Krieger

[57] ABSTRACT

A power management circuit for managing low power modes in a computer system, which implements four power modes, from highest power consumption to lowest power consumption: RUN mode, SLEEP mode, IDLE mode, and STANDBY mode. The computer system includes a PCI bus and an ISA bus, with a CPU-PCI bridge to connect the host bus and the PCI bus and a PCI-ISA bridge to connect the PCI bus and the ISA bus. The power management circuit transitions from SLEEP mode to IDLE mode by first determining if the CPU-PCI bridge is parked on the PCI bus and if it is in SLEEP mode. The power management circuit then waits for one refresh period and for all internal queues to empty before checking again to determine if the CPU-PCI bridge is still parked on the PCI bus and if it is still in SLEEP mode. If true, the CPU-PCI bridge transitions to IDLE mode. The power management circuit also performs low power refresh cycles when it is in IDLE or STANDBY mode. In those modes, the memory controller in the CPU-PCI bridge is disabled to conserve power. The power management circuit performs the refresh cycles based off an external asynchronous clock. Further, the power management circuit drives certain PCI bus signals to a certain state to avoid leakage current due to the existence of a mixture of 3.3-volt and 5-volt components connected to the PCI bus.

35 Claims, 10 Drawing Sheets

5,796,992

CIRCUIT FOR SWITCHING BETWEEN SYNCHRONOUS AND ASYNCHRONOUS MEMORY REFRESH CYCLES IN LOW POWER MODE

BACKGROUND OF THE INVENTION

1. Field of the Invention

The invention relates to power management in a computer system, and more particularly, to power management circuitry that switches between synchronous and asynchronous refresh cycles during low power mode.

2. Description of the Related Art

Personal computers are constantly evolving to provide the user with the highest performance available at the lowest cost. Performance improvements in the microprocessor and memory systems have resulted in computers so powerful that they are now capable of performing tasks that before could only be performed by large mainframe computers. Technological change is especially exemplified in the area of portable computers where power consumption efficiency is balanced against features, cost, size, weight and performance. This is especially challenging since many computer users desire the portable computer to provide nothing less than what a desktop unit can provide. In this specification, the term "portable computer" is used broadly to denote the class of computers powered by battery or solar power. Those familiar with portable computers will recognize labels such as: portable, luggable, laptop, notebook and handheld which are used to designate certain marketing segments of the larger portable computer market.

Many options are available to the computer system designer. While simply designing around the highest performance processor available will go a long way towards providing a high performance product, in today's competitive market that is not enough. The processor must be supported by high performance components including a high performance I/O bus. Several standardized I/O buses are available to the system designer including: ISA (Industry Standard Architecture); EISA (Extended Industry Standard Architecture); and PCI (Peripheral Component Interface). Today's computers are typically designed with some combination of the three buses to provide the user with the performance of the PCI bus and backward compatibility to the ISA bus. These three buses are familiar to those skilled in the art and need not be described further here. However, more details on the PCI bus are found in the PCI Local Bus Specification, Production Version, Revision 2.1, dated Jun. 1, 1995, which is published by the PCI Special Interest Group of Hillsboro, Oreg., and which is hereby incorporated by reference in its entirety.

One of the problems associated with battery-powered portable computer systems is battery life. Many solutions have been proposed to reduce power consumption of a portable computer system, particularly when the system is not in use. For example, U.S. Pat. No. 4,980,836, entitled "Apparatus for Reducing Computer System Power Consumption," describes power management circuitry which monitors for peripheral device inactivity. If a predetermined time elapses without any peripheral device activity, the computer system enters into standby mode to reduce power consumption.

With improved integrated circuit processing technology, system components have become ever more sophisticated. Increasingly, ASICs are used in computer systems to integrate bus control, bus arbitration, bus bridging, memory control, and cache control functions. As a result, power management logic can now be incorporated into these ASICs to achieve better power management schemes.

SUMMARY OF THE PRESENT INVENTION

A circuit according to the present invention performs power management functions in a computer system. The computer system has a PCI bus and an ISA bus and includes a CPU-PCI bridge connected between the host bus and the PCI bus and a PCI-ISA bridge connected between the PCI bus and the ISA bus. Preferably, the power management circuit is located in the CPU-PCI bridge. The computer system preferably implements four power levels: RUN mode for normal computer operation; SLEEP mode in which the clock to the central processing unit (CPU) is turned off; IDLE mode in which the internal clocks of the CPU, L2 cache memory, data buffers between the processor bus and the PCI bus, and the CPU-PCI bridge are turned off; and STANDBY mode which is the same as IDLE mode except that the internal clock of the PCI-ISA bridge is also turned off. RUN mode is the highest power consumption level and STANDBY mode is the lowest power consumption level.

According to one aspect of the present invention, the power management circuit transitions from SLEEP mode to IDLE mode by first determining if the CPU-PCI bridge is parked on the PCI bus and if it is in SLEEP mode. By default, if there are no other bus requests for the PCI bus, the PCI arbiter parks the CPU-PCI bridge on the PCI bus. The power management circuit then forces one refresh operation and then waits for all internal queues to empty before checking again to determine if the CPU-PCI bridge is still parked on the PCI bus and if it is still in SLEEP mode. If true, then the CPU-PCI bridge begins to transition to IDLE mode. By entering into IDLE mode this way, an extra pin is not needed to notify the power management circuit in the CPU-PCI bridge to enter IDLE mode. As a result, a pin is saved on the chip used to implement the CPU-PCI bridge.

Once the CPU-PCI bridge enters into IDLE mode, its core logic is shut off. Preferably, one portion of that core logic is the memory controller for controlling main memory, which is implemented with dynamic random access memories (DRAMs). As it is disabled in IDLE mode, the memory controller is no longer able to perform memory refresh cycles to main memory. Thus, according to another aspect of the present invention, the power management circuit performs memory refresh cycles based off an external asynchronous clock, which is preferably the clock signal used to run the real time clock (RTC). The advantage offered by the power management circuit according to this other aspect of the present invention is that the memory controller portion of the CPU-PCI bridge can be disabled to conserve power while still allowing refresh cycles to continue.

One characteristic of the PCI bus is that it is defined as a 5-volt bus. As more and more computer system peripheral components are now implemented as 3.3-volt parts, it is possible that a mixture of 3.3-volt and 5-volt parts are connected to the PCI bus. The 3.3-volt parts are capable of driving bus signals to a high of only about 3.3 volts, whereas the 5-volt parts contain input buffer circuitry which operate from the 5-volt power supply voltage. In the present computer system, the CPU-PCI bridge is preferably a 3.3-volt component with at least one other component on the PCI bus being a 5-volt part. In the IDLE and STANDBY modes, the CPU-PCI bridge is the owner of the PCI bus, and thus it has the responsibility of driving the PCI bus signals. As the input buffer circuitry in the 5-volt component works off a 5-volt supply voltage, leakage current would occur in the input buffer circuitry if received bus signals are at 3.3 volts. Thus, according to yet another aspect of the present invention, the power management circuit in the CPU-PCI bridge drives certain of the PCI bus signals to the zero state to prevent leakage current in the 5-volt component, thereby reducing power consumption in the IDLE and STANDBY modes.

BRIEF DESCRIPTION OF THE DRAWINGS

A better understanding of the present invention can be obtained when the following detailed description of the preferred embodiment is considered in conjunction with the following drawings, in which:

FIG. 1 is a schematic diagram of circuitry used to develop the RAS and CAS signals.

DETAILED DESCRIPTION OF THE PREFERRED EMBODIMENT

Figure 1:
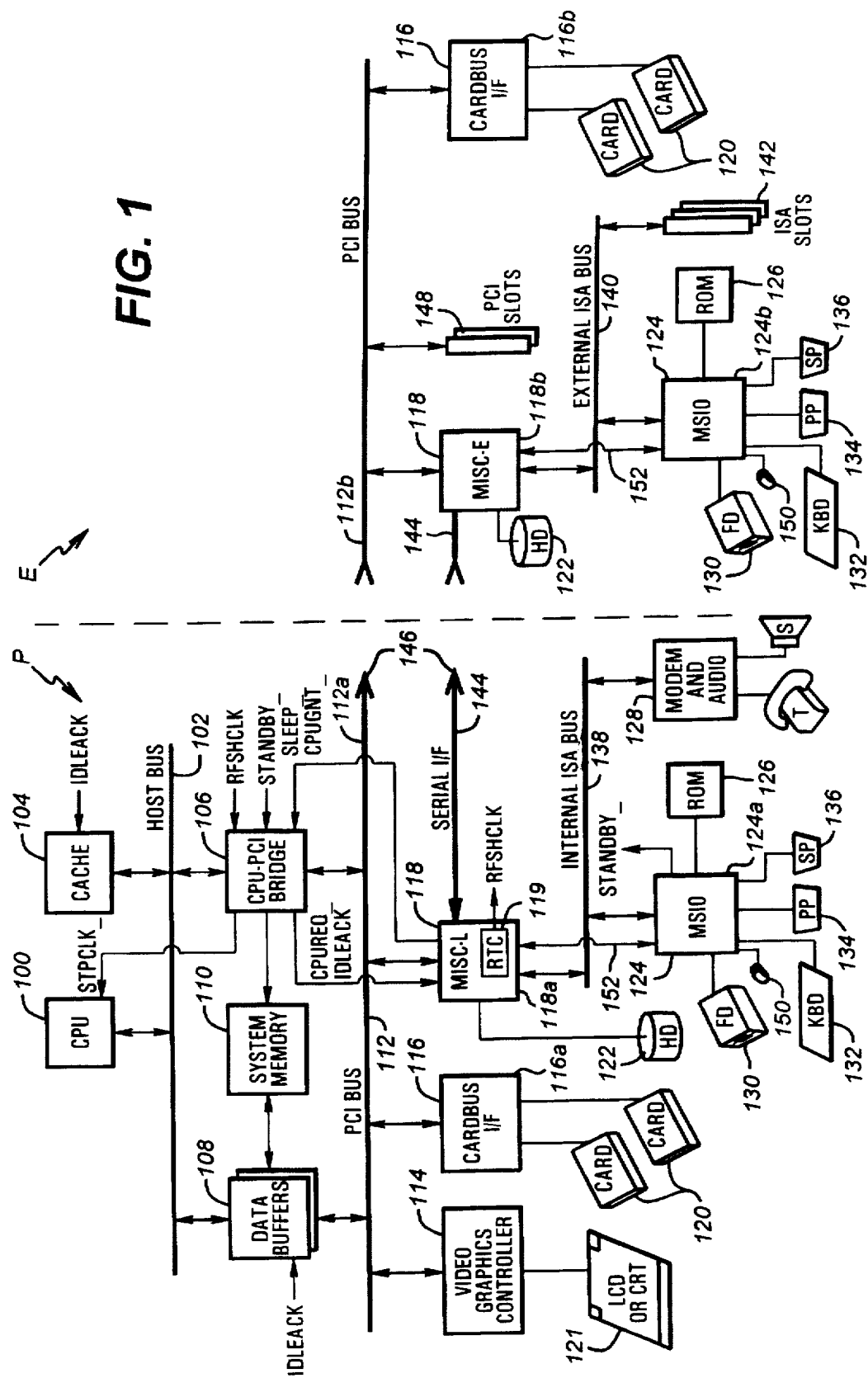
FIG. 1 is a block diagram of an exemplary computer system incorporating the preferred embodiment of the present invention.

Referring to FIG. 1, there is illustrated a block diagram of an exemplary computer system utilizing the present invention. The computer system is shown divided into a portable portion P (hereinafter portable computer) and an expansion base unit portion B (hereinafter base). The portable computer P is an operationally autonomous apparatus which is detachable from the base B for remote computing operations. While the portable computer P is docked into the expansion base unit B, the portable computer P operates on AC power, and while the computer P is detached from the base B, the portable computer P operates from battery power. Mechanisms are also provided to operate the portable computer from AC power while removed from the base B. The base B typically provides expandability for functions not included in the portable portion P.

A central processing unit (CPU) 100 is provided in the portable computer P which is a conventional microprocessor such as an Intel Pentium (P54C or P24) or its equivalent. The CPU 100 can also be a 486 family microprocessor. The Pentium P54C microprocessor is a 64-bit processor while the P24 and 486 microprocessors are 32-bit processors. The CPU 100 couples to a processor or host bus 102 for communicating with system logic such as a cache memory 104, a CPU-PCI bridge 106 and a pair of data buffers 108. The cache memory 104 is a conventional cache memory for the CPU 100 and preferably is comprised of high speed synchronous burst static random access memories (RAM). The CPU-PCI bridge 106 provides an interface to the cache memory 104 which includes tag RAMs and other logic for creating various cache ways, size, and speed configurations of the cache memory 102. The CPU-PCI bridge 106 also includes a power management circuit according to the present invention, which is described below.

The CPU-PCI bridge 106 and the data buffers 108 also couple to a main memory 110 and a peripheral component interconnect (PCI) bus 112. The CPU-PCI bridge 106 provides address and control signals to the main memory 110, which is comprised of up to 256 MBytes of conventional dynamic random access memories (DRAMs). The data buffers 108 provide a 64-bit data path between the host bus 102 and the main memory 110 and provides a 32-bit data path to the PCI bus 112. The CPU-PCI bridge 106 and data buffers 108 are proprietary devices having three major functional interfaces: a processor/cache interface, a system memory interface, and a PCI bus interface. The data buffers 108 are responsible for buffering data between the three interfaces while the CPU-PCI bridge 106 is responsible for handling addressing, command and control. Each of these interfaces operate independently from the other and include queues for read and write posting between any two of the three interfaces. The processor/cache interface allows the CPU 100 to pipeline cycles into read cycles and allows snoop accesses to the tag RAM to occur while the pipeline cycles are executing. The memory interface controls the main memory 110 and generates control signals to the data buffers 108. The interface also allows read ahead operations for those PCI masters issuing a read multiple command.

The PCI bus 112 provides a communications conduit between the portable computer P and the base B. A portion 112a of the PCI bus 112 resides in the portable computer P and includes a Quickswitch 146 for each signal of the PCI bus 112. The Quickswitches 146 are low loss series in-line MOSFET devices with the gate connected to a docking detection means for providing hot plug capabilities. When the portable computer P is docked into the base B, a portion 112b of the PCI bus 112 in the base B is coupled to the portion 112a to provide an extended PCI bus 112.

In the portable computer P, the PCI bus 112a further couples to a video graphics controller 114, a Cardbus interface 116 (particularly 116a) and a mobile integrated system controller (MISC) 118 (particularly 118a). In the base B, the PCI bus 112b further couples to a second MISC 118 (particularly 118b), two PCI slots 148, and a second Cardbus interface 116 (particularly 116b). The video graphics controller 114 further couples to a low power liquid crystal display (LCD) 121 or alternatively a cathode ray tube (CRT) monitor. The Cardbus interface 116 is provided for communicating with PCMCIA or Cardbus add-on cards 120, such as networking cards, modem cards, solid state storage cards and rotating storage cards. The MISC or PCI-ISA bridge 118 provides an interface to an Industry Standard Architecture (ISA) bus 138 or 140, and an integrated drive electronics (IDE) hard drive interface for communicating with hard drives 122 and CD-ROM drives. The MISC 118 is configurable based on an input pin (LAP_EXT_) for use in both the portable computer P, as MISC-L 118a, and base B, as MISC-E 118b. Thus, two MISC devices, 118a and 118b are coupled to the PCI bus 112, with MISC-L 118a coupled to the PCI bus portion 112a and MISC-E 118b coupled to PCI bus portion 112b. MISC-L is further coupled to the internal ISA bus 138 while MISC-E is coupled to the external ISA bus 140.

As the general functionality of MISC-L 118a and MISC-E 118b are very similar, at this point they are discussed together for simplicity. The MISC 118 bridges the PCI bus 112 to the ISA bus 138/140 and acts as both a master and slave on the PCI bus 112 and a bus controller on the ISA bus 138/140. The MISC 118 further includes a PCI bus arbiter, an ISA bus arbiter, 8237 compatible direct memory access (DMA) controllers, an enhanced DMA controller for fast IDE hard drives, 8254 compatible timers, an 8259 compatible interrupt controller, hot docking support logic, system power management logic, and plug and play support (all not shown in FIG. 1). Some components will be disabled upon initialization by software to prevent conflicts or duplication. The MISC 118 also contains a serial interrupt interface 144 for serially passing interrupts from MISC-E 118b to MISC-L 118a which provides an interrupt architecture for supporting standard ISA interrupts in a PCI based system.

The MISC 118 and the ISA buses 138 and 140 provide support for standard ISA peripherals such as those combined in a Mobile Super Input/Output (MSIO) peripheral chip 124. The MSIO chip 124 is a proprietary chip having a combination of standard ISA peripherals, such as a real time clock (RTC) 119; a floppy controller for interfacing to standard floppy drives 130; an 8051 compatible microcontroller for communicating with a pointing device 150, for performing scanning and key code conversions on a keyboard 132, and for performing power management functions; a universal asynchronous receiver transmitter (UART) for providing standard serial ports 136; and parallel port logic for a parallel port 134. The RTC 119 provides real time clock functions and also provides a clock signal RFSHCLK, which is received by the CPU-PCI bridge 106 for performing low power asynchronous refresh cycles, as explained in detail below.

A read only memory (ROM) 126 couples to the MSIO 124 for providing code to the 8051 microcontroller. Additionally, the ROM 126 provides basic input/output services (BIOS) code to the CPU 100 which is copied from the ROM 126 and shadowed in system memory 110 upon system initialization so that thereafter the 8051 microcontroller may access the ROM 126.

In the portable computer P, a modem and audio peripheral chip 128 is also provided and coupled to the ISA bus 138. The modem and audio peripheral chip 128 includes a standard telephony communications port for coupling to a telephone T, and an interface for coupling to a pair of stereo speakers S. In the base B, three ISA expansion slots 142 are provided for standard ISA cards.

In the portable computer P, the components connected to the PCI bus 112a are all 3.3-volt parts except the video graphics controller 114, which is a 5-volt part. Thus, in the portable computer P, the CPU-PCI bridge 106, the data buffers 108, the MISC-L 118a, and the PCMCIA interface card 116a are 3.3-volt parts. In the base B, the MISC-E 118b and the PCMCIA interface card 116b are 3.3-volt parts. As a result, in the portable computer P, a mixture of 3.3-volt and 5-volt parts exist which are connected to the PCI bus 112a.

Figure 2:
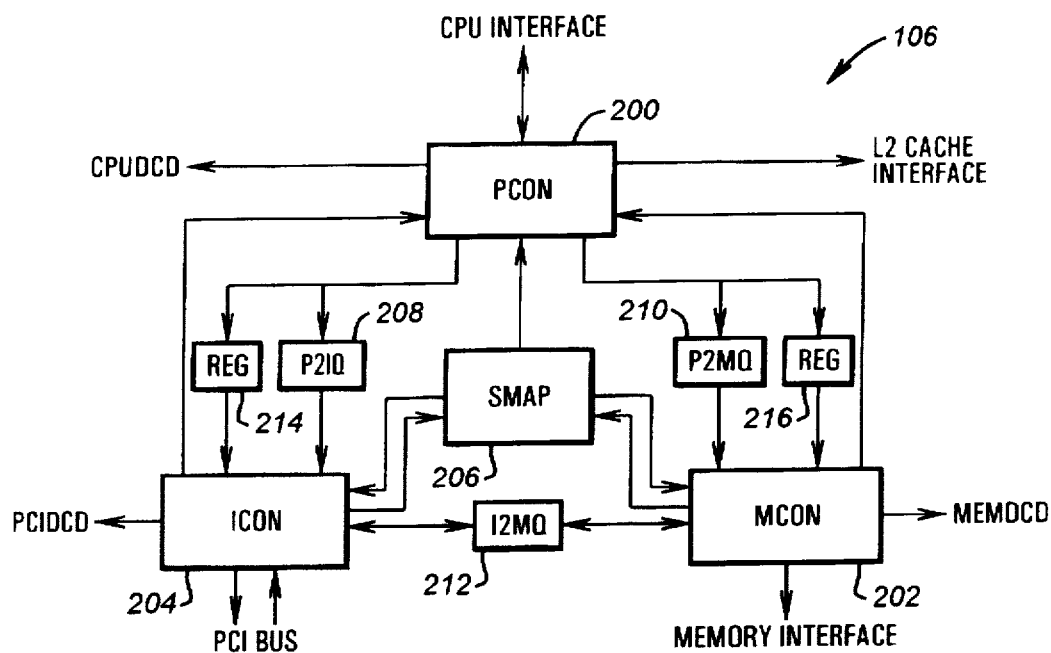
FIG. 2 is a block diagram of a CPU-PCI bridge in the computer system of FIG. 1.

Referring to FIG. 2, various blocks in the CPU-PCI bridge 106 are shown. The three major functional interfaces in the CPU-PCI bridge 106 are the processor/L2 cache controller (PCON) 200, memory controller (MCON) 202, and PCI controller (ICON) 204. The PCON 200 controls the CPU interface, the L2 cache 104, and signals CPUDCD[2:0] provided to the data buffers 108. The control signals CPUDCD[2:0] control when the data buffers 108 should drive the processor bus 102, latch the processor bus 102, or increment internal queues. The PCON 200 also includes logic for arbitrating between CPU and PCI master requests for the L2 tag RAMs.

The MCON 202 controls the DRAMs 110 with RAS, CAS, WE and address signals. In particular, the MCON 202 provides address signals MA[11:0] to the DRAM, which are strobed in as either row or column addresses. The MCON 202 also provides row address strobe signals RASA[5:0]_ to control the upper 32 bits of the DRAMs 110 and signals RASB[5:0]_ to control the lower 32 bits of the DRAMs 110. In the present description, a signal name followed by the character "_" signifies that the signal is active low. The MCON 202 also provides column address strobe signals CASA[7:0]_ to control memory banks 0 and 1, which are preferably soldered to the system board, and column address strobe signals CASB[7:0]_ to control memory banks 2, 3, 4 and 5, which are optionally inserted in SIMM sockets. A memory write enable signal MWE_ provided to the DRAMs 110 is asserted to indicate a memory write cycle.

The MCON 202 also generates control signals MEMDCD[1:0] to the data buffers 108. The control signals MEMDCD[1:0] indicate when the data buffers 108 should drive to or read from the memory data bus MD. The control signals MEMDCD[1:0] also indicate whether the memory bus transaction is between memory and a PCI master or the CPU 100. The MCON 202 also contains arbitration logic for arbitrating requests to the main memory 110.

The ICON 204 controls the interface to the PCI bus 112 and also provides control signals PCIDCD[3:0] to the data buffers 108. When the CPU 100 accesses the PCI bus 112, the ICON 204 operates as a PCI master. When a PCI master accesses the main memory 110, the ICON 204 acts as a PCI slave. The control signals PCIDCD[3:0] control whether the data buffers 108 should drive to or read from the PCI data bus. The control signals PCIDCD[3:0] also control whether data is routed between the PCI bus 112 and the CPU 100 or memory 110.

The CPU-PCI bridge 106 also includes three sets of queues: a CPU-to-PCI queue (P2IQ) 208, a CPU-to-memory queue (P2MQ) 210, and a PCI-to-memory queue (I2MQ) 212. The P2MQ 210 handles posted writes from the CPU 100 to the main memory 110. The P2IQ 208 handles posted writes from the CPU 100 to the PCI bus 112. Finally, the I2MQ 212 handles writes from PCI masters to the memory 110 as well as reads by PCI masters from the memory 110. Preferably, the I2MQ 212 is a content addressable memory, which allows each entry in the I2MQ 212 to be snooped simultaneously. The P2IQ 208, P2MQ 210, and I2MQ 212 are used to post addresses for the various cycles. For processor-to-memory read cycles and processor-to-PCI read cycles, simple read registers 214 and 216, respectively, are used.

Also included in the CPU-PCI bridge 106 is a system map (SMAP) block 206, which controls various processor, PCI interface, and memory decode and timing parameters. Because only one master can run locked cycles to the PCI bus 112, the SMAP block 206 also provides a locked resource. The locked resource may be owned by either the CPU 100 or a PCI master, but not both. The locked resource is owned by a master while it runs a locked sequence. When the CPU 100 owns the locked resource, the CPU 100 can run locked cycles to the memory 110 or to the PCI bus 112. If the CPU 100 is locking memory, the PCI masters cannot access main memory 110. If the locked resource is owned by the CPU 100, the ICON 204 retries any PCI masters attempting to run locked cycles to the main memory 110. When a PCI master owns the locked resource, the CPU 100 cannot run a locked cycle to the PCI bus 112 or the memory 110. If the locked resource is owned by a PCI master, the PCON 200 stalls any CPU locked cycles.

The P2MQ 210 is a 43-bit wide queue which is 8 entries deep for storing addresses of posted CPU write cycles to the main memory 110. In the preferred embodiment, bits 35–42 indicate which memory bank is being addressed. Bit 34 indicates if an operation is atomic, e.g., locked cycles or allocate-write back cycles from the L2 cache 104. Bit 33 indicates that a cycle is a non-postable write. Bits 25–32 indicate which byte enables are asserted for a write transaction. Finally, bits 0–24 correspond to processor address signals PA[3:27].

The P2IQ 210 is a 44-bit wide queue that is four entries deep for storing the addresses of CPU-to-PCI write cycles. Bit 43 of each entry indicates that the cycle is a PCI special cycle. Bit 42 indicates that the SMAP block 206 has decoded the address as being located on the ISA bus. Bit 41 indicates whether the cycle is an I/O cycle or a memory cycle. Bit 40 indicates if the write is to a non-postable address. Bit 39 indicates that an operation is atomic. Bit 38 indicates if the cycle is locked, which causes the ICON 204 to lock the accessed PCI slave. Bit 37 indicates if the cycle is a PCI configuration cycle. Bits 29–36 indicate which byte enables are asserted for a write transaction. Finally, bits 0–28 correspond to the processor address signals PA[3:31].

The I2MQ 212 is 44 bits wide and two cache lines deep. If a Pentium P54C processor is used, the I2MQ 212 is eight entries deep. If the Pentium P24 or 486 processors are used, then the I2MQ 212 is four entries deep. Each entry in the I2MQ 212 stores an address.

Bits 35–42 of the address indicate which memory bank is being addressed. Bit 34 indicates if the entry must be snooped. Bit 33 indicates if a cycle is locked. Bits 25–32 indicate which byte enables are asserted for a write transaction. Finally, bits 0–24 correspond to PCI write address signals PCIAD[3:27].

The CPU-PCI bridge 106 also includes power management logic. The power management scheme used in the computer system of the preferred embodiment consists of four modes with varying degrees of power consumption. The CPU-PCI bridge 106 contains portions of the control logic necessary to transition between these modes. The four modes, in order from highest to lowest power consumption, are the RUN, SLEEP, IDLE and STANDBY modes. The RUN mode is the state of normal operation. The CPU-PCI bridge 106 remains in the RUN mode until it receives a request from the MISC 118 to enter the SLEEP mode. The MISC 118 makes such a request by asserting a signal SLEEP_ to the CPU-PCI bridge 106.

The MISC 118 asserts the signal SLEEP_ in response to its internal stop clock register being set to a predetermined value in response to certain conditions. First, the operating system detects for system idleness when all software applications and device drivers are inactive. If so, the operating system notifies the BIOS of the system idle condition. The BIOS then performs a write to the stop clock register, which then causes the MISC 118 to assert the signal SLEEP_.

In addition, the MISC 118 asserts the SLEEP_ signal in response to when no interrupt activity has occurred for a programmed period of time. When a timer in the MISC 118 times out, the MISC 118 generates a system management interrupt (SMI). In response, a SMI handler is invoked to shut down the hard drive 122 and floppy drive 130, and also to write to the stop clock register in the MISC 118, which causes the MISC 118 to assert the signal SLEEP_.

When the CPU-PCI bridge 106 detects that the signal SLEEP_ has been asserted by the MISC 118, the PCON 200 responds by asserting a signal STPCLK_ to the CPU 100. This is a request to the CPU 100 to enter the STOP GRANT state. In response to assertion of the signal STPCLK_, the CPU 100 generates a STOP GRANT cycle on the CPU bus 102 to indicate that the CPU 100 is entering the STOP GRANT state, in which the internal clock of the CPU 100 is disabled to conserve power. In the STOP GRANT state, the CPU 100 is still able to respond to snoop cycles as well as interprocessor interrupts in the case of the Pentium P54 processor.

The CPU-PCI bridge 106 remains in the SLEEP mode until one of the following two conditions occur. First, if the signal SLEEP_ is deasserted, the CPU-PCI bridge 106 returns to the RUN mode and removes STPCLK_. Alternatively, according to one aspect of the present invention, if the signal SLEEP_ is asserted while the CPU-PCI bridge 106 is parked on the PCI bus 112 (i.e., the PCI grant signal CPUGNT_ to the CPU-PCI bridge 106 is asserted while the PCI request signal CPUREQ_ driven by the ICON 204 is deasserted), if all posted memory writes have completed (i.e., all queues are emptied), and if any pending refresh requests have been serviced, when the above conditions are detected, the CPU-PCI bridge 106 begins the transition from SLEEP mode to IDLE mode. The CPU-PCI bridge 106 forces one refresh cycle to complete to guarantee adequate refreshing and to put the memory controller into an idle state. Following the refresh cycle the CPU-PCI bridge 106, determines if the above conditions are still true; if so, the CPU-PCI bridge 106 transitions from SLEEP mode to the IDLE mode.

In the IDLE mode, the internal clocks of the CPU 100, the CPU-PCI bridge 106, the data buffers 108, and the L2 cache 104 are disabled. A signal IDLEACK is provided by the CPU-PCI bridge 106 to the MISC 118 to indicate that IDLE mode has been reached. The signal IDLEACK is also provided to the L2 cache 104 and the data buffers 108 to disable their internal clocks. When the signal IDLEACK is asserted, the CPU-PCI bridge 106 acts as a PCI master and drives the PCI bus 112. While the signal IDLEACK is asserted, the MISC 118 does not grant the PCI bus 112 to any other PCI bus master. Further, while the signal IDLEACK is asserted by the CPU-PCI bridge 106, if the MISC 118 deasserts the signal CPUGNT_ to unpark the CPU-PCI bridge 106, or if the MISC 118 deasserts the signal SLEEP_, the signal IDLEACK will be deasserted by the CPU-PCI bridge 106. Once the signal IDLEACK is deasserted, the MISC 118 can grant the PCI bus 112 to other PCI masters after at least one PCI clock period.

To reduce current to other components on the system board during the IDLE mode, the CPU-PCI bridge 106 drives the memory address signals MA[11:0] to all 0s, drives the PCI address/data bus PCIAD[31:0] to all 0s, drives the PCI command/byte enable signals PCIBE[3:0]_ to all 0s, drives the signals PCIDCD[3:0] to all 1s, drives the signal CPUDCD[1] high for Pentium processors and low for 486 processors, and drives the signal CPUDCD[0] high for 33 MHz operation and low for 50, 60 and 66 MHz operation. The PCIDCD[3:0] signals are driven to these states because that reflects the pullup or pulldown condition for each line for each alternative, which condition is used during reset for configuration purposes. Driving to the pullup or pulldown condition minimizes the power lost in the pullup or pulldown resistors. The signals MEMDCD[1:0] remain in their idle states of all 0s. The signals PCIDCD[3:0] are driven to the hexadecimal value of 0xF to reflect a pullup condition used to configure the CPU-PCI bridge 106.

As discussed above, the video graphics controller 114 is a 5-volt part while the other components connected to the PCI bus 112 are 3.3-volt parts. As a result, the 3.3-volt parts drive PCI signals to a high value of about 3.3 volts. If an input signal to the 5-volt video graphics controller 114 is driven to 3.3 volts, the input buffer circuitry of the video graphics controller 114 will recognize the input as a high input, but leakage current will flow in the input buffer transistors because of the incomplete high input voltage. In IDLE mode, where minimal power consumption is desired, the power management circuit according to another aspect of the present invention in the CPU-PCI bridge 106 drives the PCI address/data signals PCIAD|31:0| and byte enable signals PCIBE|3:0|_ to all 0s to avoid as much as possible leakage current in the input buffer circuitry of the video graphics controller 114.

Figure 8:
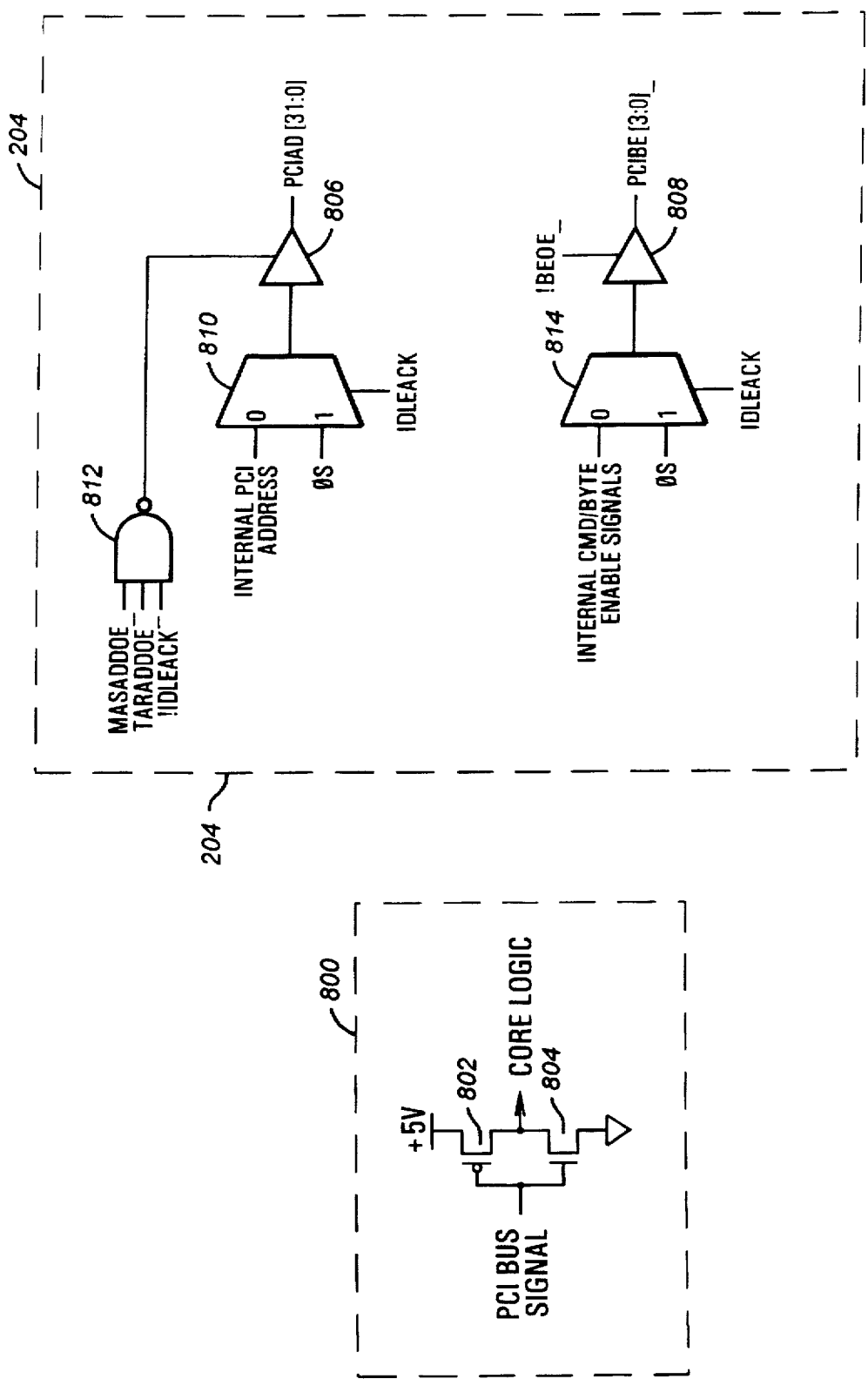
FIG. 8 is a schematic diagram of circuitry used to drive PCI bus signals to predetermined states.

Referring to FIG. 8, a schematic diagram is shown of circuitry used to drive PCI bus signals PCIAD|31:0| and PCIBE[3:0]_. A simplified representation of an input buffer 800 in the 5-volt video graphics controller 114 is shown. The input buffer 800 includes a P-channel MOSFET 802 and an N-channel MOSFET 804 arranged as an inverter. The drain of the P-channel MOSFET 802 is connected to the 5-volt power supply voltage and the source of the N-channel MOSFET 804 is connected to ground. The gates of the MOSFETs 802 and 804 are connected to a PCI bus signal, and the common node is provided to the core logic of the video graphics controller 114. If the input bus signal is driven to 3.3 volts, the N-channel MOSFET 804 is turned on but the P-channel MOSFET 802 is not completely turned off because the drain-to-gate voltage is greater than the threshold voltage of the P-channel MOSFET 802. The P-channel MOSFET 802 does not get pinched off, which results in leakage current flow between the 5-volt supply and ground.

To prevent the leakage current, the PCI address/data signals PCIAD|31:0| and byte enable signals PCIBE|3:0]_ are driven low by the CPU-PCI bridge 106. The CPU-PCI bridge 106 drives signals PCIAD[31:0] via a tristate buffer 806, whose input is connected to the output of a 64:32 multiplexor 810. The tristate buffer 806 is enabled by the output of a NAND gate 812. The inputs of the NAND gate 812 receive a master logic output enable signal MASADDOE_, a target logic output enable signal TARADDOE_, and the signal !IDLEACK. The signal MASADDOE_ is provided by the PCI master logic in the ICON 204, and the signal TARADDOE_ is provided by the PCI slave logic in the ICON 204. The 0 input of the multiplexor 810 receives the normal PCI address from internal circuitry in the CPU-PCI bridge 106, while the 1 input is tied to 0s. The select input of the multiplexor 810 receives the signal IDLEACK. Thus, in IDLE or STANDBY mode, the signals PCIAD|31:0| are all driven low.

The signals PCIBE[3:0]_ are driven by a tristate buffer 808, whose input is connected to the output of an 8:4 multiplexor 814. The select input of the multiplexor 814 receives the signal IDLEACK, its 0 input receives the multiplexed command or byte enable signals in the CPU-PCI bridge 106, and the 1 input of the multiplexor 814 is tied to 0s. The enable input of the tristate buffer receives a byte enable output enable signal !BEOE_, which is asserted when the CPU-PCI bridge 106 is parked on the PCI bus 112. A signal name preceded by the character "!" indicates that the signal is inverted. Thus, in IDLE or STANDBY mode, the PCI bus signals PCIBE|3:0|_ are also driven low.

By driving the address/data and byte enable signals to all 0s, the amount of leakage current flowing through the input buffer circuitry of the video graphics controller 114 is significantly reduced. In this condition, the N-channel MOSFET 804 is off and the P-channel MOSFET 802 is also off because the drain-to-source voltage of the P-channel MOSFET 802 is about zero volts in steady state. A similar solution can be applied in a system where there exists a mixture of 3.3-volt and 2.5-volt components.

During IDLE mode, the clock to the core logic of the CPU-PCI bridge 106 is shut off. Consequently, the MCON 202 is unable to perform normal refresh cycles to the DRAMs 110. However, according to yet another aspect of the present invention, the CPU-PCI bridge 106 receives an asynchronous clock RFSHCLK from the MSIO chip 124, which is used to run the real time clock (RTC). The signal RFSHCLK preferably has a frequency of about 32 kHz with approximately a 50—50 duty cycle.

Based on the asynchronous refresh clock RFSHCLK, low power refresh logic in the MCON 202 that is not shut off in the IDLE mode generates CAS-before-RAS (CBR) refresh cycles. To generate the low power CBR refresh cycles, the MCON 202 maintains the CASA_ and CASB_ signals asserted during the IDLE mode, and the RASA_ and RASB_ signals are pulsed low for a minimum of 80 nanoseconds (ns) every 15.625, 31.25, 62.5 or 125 microseconds, depending on the programmed refresh rate. The RASB_ signals are preferably delayed 10 ns from the RASA_ signals to lower current spikes on the system board. Using dedicated circuitry to perform refresh cycles based on an external asynchronous clock RFSHCLK during the IDLE or STANDBY mode allows the normal memory controller logic to all be disabled, thereby saving power consumption.

To transition to or from the IDLE mode, the CPU-PCI bridge 106 must turn off or on the internal clock tree cleanly. The CPU-PCI bridge 106 must also provide adequate RAS precharge time when switching between normal memory controller accesses and the asynchronous CBR refresh cycles generated from the asynchronous clock RFSHCLK. The MCON 202 has logic to handle these tasks. The MCON 202 is generally divided into two sections, a front end section and a back end section. The front end section is the interface to the PCON 200 and the ICON 204, while the back end section is the interface to the DRAMs 110.

Figure 4:
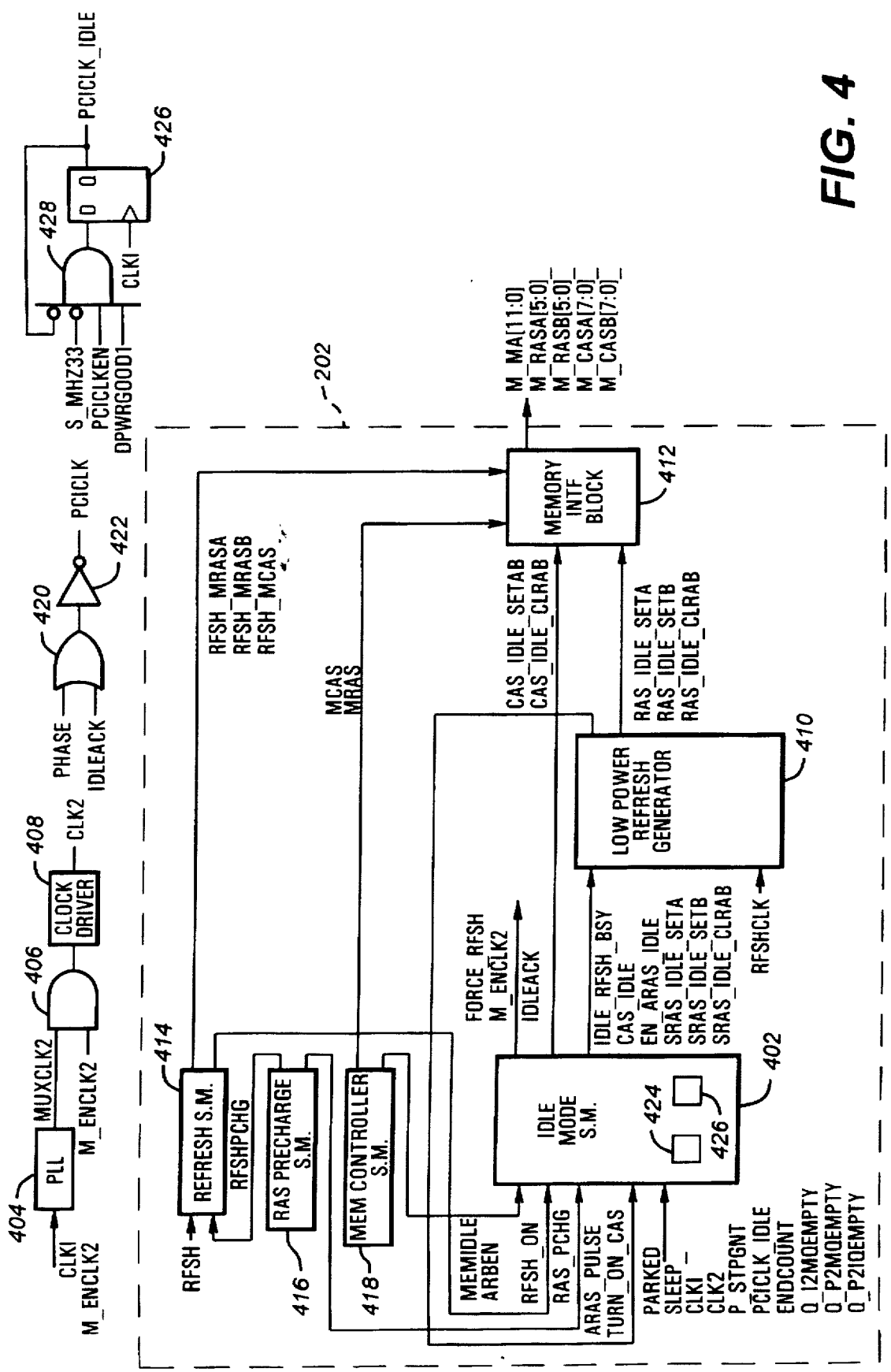

Referring to FIG. 4, portions of the back end section of the MCON 202 are shown. The back end section includes an IDLE mode controller 402 that runs off an input reference clock signal CLKI to the CPU-PCI bridge 106. The signal CLKI is programmable to run either at 33, 50 or 66 MHz and is provided to a PLL block 404. The PLL block 404 generates at its output a clock signal MUXCLK2, which is programmable between 33 MHz or 66 MHz. An enable signal M_ENCLK2 is also fed into the PLL block 404. If the signal M_ENCLK2 is deasserted, the signal MUXCLK2 is disabled. The signal MUXCLK2 is fed to one input of a two-input AND gate 406, whose other input receives the signal M_ENCLK2. The output of the AND gate 406 is provided to the input of a clock driver block 408, whose output drives a clock signal CLK2 which is provided as the main clock signal to the core logic of the CPU-PCI bridge 106.

The enable signal M_ENCLK2 is provided by the IDLE mode controller 402, which also generates the signal IDLE-ACK provided to the data buffers 108, the L2 cache 104, and the MISC 118. The IDLE mode controller 402 also provides a signal FORCE_RFSH, which is driven to a refresh request block 304 (FIG. 3) to force a refresh cycle before the CPU-PCI bridge 106 enters the IDLE mode. The IDLE mode controller 402 includes a state machine 424 and peripheral logic 426. The controller provides various signals to a low power refresh generator 410, which in turn provides certain signals to a memory interface block 412. The memory interface block 412 generates signals M_MA|11:0| for driving memory address signals MA|11:0|, signals M_RASA|7:0|_ and M_RASB|7:0|_ for driving row address strobe signals RASA|7:0|_ and RASB|7:0|_, respectively, and signals M_CASA|7:0|_ and M_CASB |7:0|_ for driving column address strobe signals CASA |7:0|_ and CASB|7:0|_, respectively.

The signals generated by the low power refresh generator 410 include a signal RAS_IDLE_SETA for setting active the M_RASA_ signals driven by the memory interface block 412, a signal RAS_IDLE_SETB for setting active the M_RASB_ signals, and a signal RAS_IDLE_CLRAB for clearing the M_RASA_ and M_RASB_ signals.

The IDLE mode controller 402 also generates a signal CAS_IDLE_SETAB for asserting the M_CASA_ and M_CASB_ signals during IDLE and STANDBY modes, and a signal CAS_IDLE_CLRAB for deasserting the M_CASA_ and M_CASB_ signals after the IDLE mode controller 402 transitions out of IDLE mode. During the IDLE and STANDBY modes, the CASA_ and CASB_ signals are maintained continuously asserted to allow for the generation of CBR refresh cycles.

The signals provided by the IDLE mode controller 402 to the low power refresh generator 410 include the following: a signal EN_ARAS_IDLE, which is asserted to enable the low power refresh generator 410 to generate asynchronous pulses off the clock RFSHCLK to pulse the M_RASA_ and M_RASB_ signals; signals SRAS_IDLE_SETA and SRAS_IDLE_SETB for synchronously turning on the M_RASA_ and M_RASB_ signals, respectively, when the CPU-PCI bridge 106 is entering or exiting IDLE mode; a signal SRAS_IDLE_CLRAB which synchronously turns off the M_RASA_ and M_RASB_ signals when entering or exiting IDLE mode; a signal IDLE_RFSH_BSY, which when asserted is an indication that the CPU-PCI bridge 106 is parked, the MCON 202 is idle, and the CPU-PCI bridge 106 is ready to have its internal clock tree shut off; and a signal CAS_IDLE which indicates that the IDLE mode CBR refresh is active.

The low power refresh generator 410 routes back certain signals to the IDLE mode controller 402. These signals include a signal ARAS_PULSE which is generated from the clock RFSHCLK and a signal TURN_ON_CAS for turning on the CAS signals to the DRAMs 110 for generating the low power CBR refresh cycles.

The IDLE mode controller 402 receives a signal PARKED from the ICON 204, which when asserted indicates that the CPU-PCI bridge 106 is parked on the PCI bus 112. The IDLE mode controller 402 also receives the signal SLEEP_ from the MISC 118. The other input signals received by the IDLE mode controller 402 include the external reference clock input signals CLKI; the internal main clock signal CLK2; a signal P_STPGNT which when asserted indicates that the CPU 100 is currently in the STOP GRANT state; a signal ENDCOUNT provided by a refresh counter 316 (FIG. 3) to indicate that a refresh count interval has elapsed; and signals Q_I2MQEMPTY, Q_P2MQEMPTY, and Q_P2MQEMPTY which when asserted indicates that the I2MQ 212, P2MQ 210 and P2IQ 208 are empty, respectively.

The IDLE mode controller 402 also receives certain other signals. One of the signals is a signal RFSH_ON from a refresh state machine 414. Assertion of the signal RFSH_ ON indicates that the MCON 202 is servicing a refresh request. The refresh state machine 414 receives a signal RFSH driven by a memory arbiter 302 (FIG. 3) in the front end section of the MCON 202. The signal RFSH is asserted high if the memory arbiter 302 grants access to the main memory 110 to a refresh request. The other signals driven by the refresh state machine 414 are a signal RFSH_MCAS to turn on the CAS signals and signals RFSH_MRASA and RFSH_MRASB to turn on the RASA_ and RASB_ signals, respectively, to perform a normal CBR refresh cycle.

The IDLE mode controller 402 also receives a signal RASPCHG from a RAS precharge state machine 416. The RAS precharge state machine 416 determines how long the RAS precharge, i.e., RASA_ and the RASB_ high time, should be. Assertion of the signal RASPCHG indicates that all RAS signals are inactive and the RAS precharge time has elapsed. Depending upon whether the DRAMs used in the main memory 110 are 60 ns, 70 ns, or 80 ns parts, and depending on the frequency of the signal CLK2, the RAS precharge time is programmable between two through five CLK2 periods. The RAS precharge signal RFSHPCHG is also driven to the refresh state machine 414 to prevent assertion of the signals RFSH_MCAS, RFSH_MRASA and RFSH_MRASB while the signal RFSHPCHG is negated.

Other signals received by the IDLE mode controller 402 are signals MEMIDLE and ARBEN driven by a memory controller state machine 418. The signal MEMIDLE is asserted high when the memory controller state machine 418 is in its idle state, and the signal ARBEN is asserted high to enable an arbitration cycle in the memory arbiter 302. The memory controller state machine 418 also drives a signal MRAS to control signals RASA_ and RASB_ and a signal MCAS to control signals CASA_ and CASB_ during normal memory operations. The signals MRAS and MCAS are provided to the memory interface block 412 to control generation of the signals M_RASA|7:0|_, M_RASB|7:0| _, M_CASA|7:0|_, and M_CASB|7:0|_.

The fourth mode that the CPU-PCI bridge 106 can enter into is the STANDBY mode, which is the lowest power state of the computer system with the power supply voltages still applied. In the STANDBY mode, the external reference clock CLKI to the CPU-PCI bridge 106 is stopped. The CPU-PCI bridge 106 enters into the STANDBY mode in response to the clock CLKI being stopped while the CPU-PCI bridge 106 is asserting the signal IDLEACK, followed by the STANDBY_ input to the CPU-PCI bridge 106 being driven low. The signal STANDBY_ is driven by the MSIO 124.

The MSIO 124 checks for certain conditions to assert the signal STANDBY_. One condition is when the standby button on the portable computer P is pressed. The second condition is when a low-battery condition is detected and hibernation mode is disabled. If hibernation mode is enabled, the state of the computer system can be stored onto hard disk in response to certain conditions. When the MSIO 124 detects these conditions, it relays a SMI to the MISC 118 via the serial bus 152. The MISC 118 then responds by generating a SMI to the CPU 100. In response, a second SMI handler is invoked to perform the STANDBY power management functions. The second SMI handler writes a second predetermined value to the stop clock register in the MISC 118 for placing the MISC 118 into the low power state. If the signal SLEEP_ is not already asserted, the MISC 118 asserts the signal SLEEP_ to begin the transitions to the SLEEP and IDLE modes. When the CPU-PCI bridge 106 asserts the signal IDLEACK back to the MISC 118, an internal IDLE status register bit is set. The contents of this status register are shadowed in a register in the MSIO 124. Any change in the IDLE status register bit is transmitted over the serial bus 152 to be shadowed in the MSIO 124. When the MSIO 124 detects that the IDLE status register bit is set, it responds by asserting the signal STANDBY_ to the CPU-PCI bridge 106.

In STANDBY mode, the CPU-PCI bridge 106 continues to drive the signals MA|11:0|, PCIAD|31:0|, PCIBE|3:0|_, PCIDCD|3:0| and CPUDCD|1:0| to the same values as were driven during the IDLE mode. In STANDBY mode, the internal clocks of the PCI-ISA bridge or MISC 118 are also shut off. However, the asynchronous clock RFSHCLK continues to run in the STANDBY mode, so that the asynchronous CBR refresh cycles continue to refresh main memory 110.

To come out of STANDBY mode, the signal STANDBY is first deasserted, and then the external reference clock CLKI to the CPU-PCI bridge 106 is applied. This brings the CPU-PCI bridge 106 back to the IDLE mode. As the signal CLKI is deasserted and the PLL block 404 is shut off, the MISC 118 waits a minimum of 1 millisecond before deasserting either of signals SLEEP_ or CPUGNT_ after the external clock CLKI has been started. This allows time for the PLL block 404 to get synchronized to the input clock CLKI so that when the signal M_ENCLK2 is reasserted, the PLL block 404 is stable and running at is normal operating frequency.

The PCI clock on the PCI bus 112 is used by certain logic in the ICON 204. To be used properly, the PCI clock is synchronized to the signal CLK2. The internal synchronized PCI clock is designated as a signal PHASE, which is provided to one input of a two-input OR gate 420, whose other input receives the signal IDLEACK. The output of the OR gate 420 drives the input of an inverter 422, whose output is a signal PCICLK used by logic in the ICON 204. When the signal IDLEACK is driven high, indicating that the CPU-PCI bridge 106 is either in the IDLE mode or the STANDBY mode, the clock PCICLK is maintained low to conserve power.

Since the signal CLK2 is disabled in the IDLE mode, a second internal PCI clock signal PCICLK_IDLE is provided to the IDLE mode controller 402, which is synchronous to the external reference clock CLKI rather than to the internal clock CLK2. The signal PCICLK_IDLE is provided by a D-type flip flop 426, which is clocked by the signal CLKI. The D input of the flip flop 426 is connected to the output of a four-input AND gate 428, which receives at its inputs a signal DPWRGOOD1 (indicating power supply voltages are stable in the computer system), a signal PCICLKEN (indicating that the CPU-PCI bridge 106 is not in reset), the inverted state of a signal S_MHZ33 (indicating that the computer system is in 33 MHz mode), and the inverted state of the signal PCICLK_IDLE. Thus, in non-33 MHz mode, the signal PCICLK_IDLE is toggled with the rising edge of the signal CLKI. In 33 MHz mode, the signal PCICLK_IDLE is maintained low.

Figure 3:
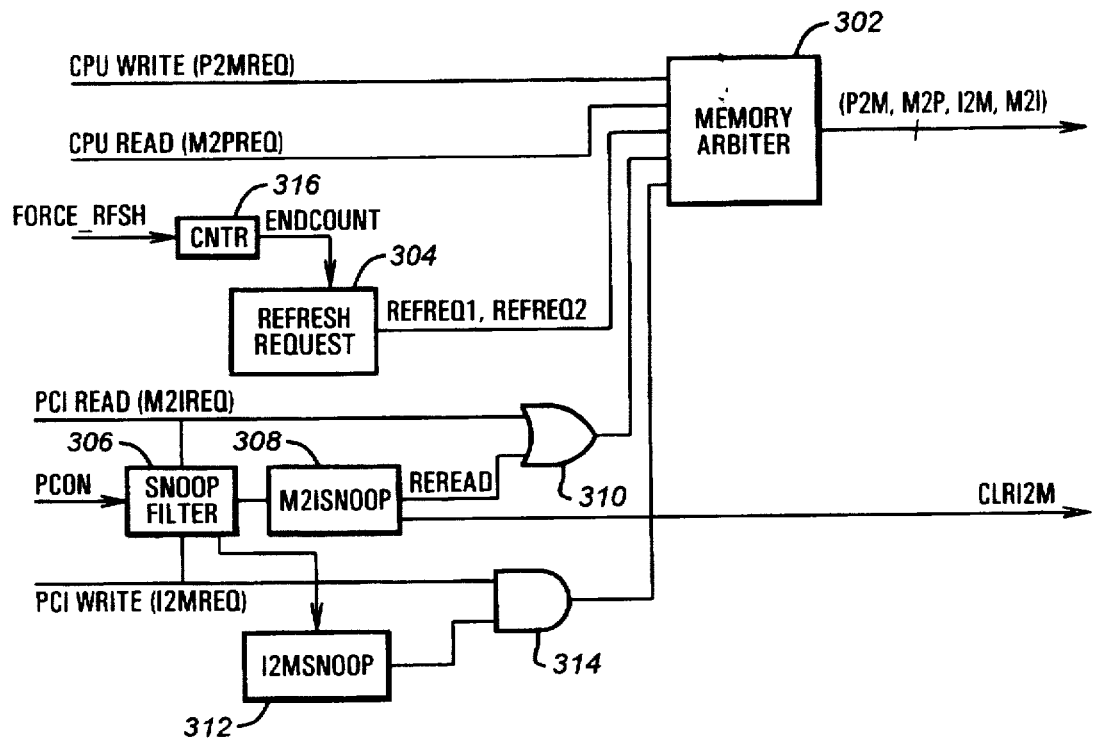
FIGS. 3 and 4 are block diagrams of a memory controller in the CPU-PCI bridge of FIG. 2.

Referring to FIG. 3, portions of the front end section of the MCON 202 are shown. The front end section of the MCON 202 handles snooping of PCI cycles, refresh request generation, and arbitration of all CPU, PCI and refresh request cycles to the memory 110. The memory requests include: a CPU-to-memory write request indicated by a signal P2MREQ; a CPU-to-memory read request indicated by a signal M2PREQ; a refresh request indicated by signals REFREQ1 and REFREQ2; a PCI-to-memory read request indicated by a signal M2IREQ; and a PCI-to-memory write request indicated by a signal I2MREQ. The request signals are routed to the inputs of the memory arbiter 302. The refresh request signals REFREQ1 and REFREQ2, representing first and second refresh requests, respectively, are provided by a refresh request block 304. The refresh request block 304 receives a signal ENDCOUNT from a refresh counter 316, which when asserted indicates that a refresh count interval has elapsed and the refresh request block 304 should assert another refresh request. The refresh request block 304 also receives a signal FORCE_RFSH, which when asserted by the IDLE mode controller 402 (FIG. 4) will force the signal ENDCOUNT to be asserted.

The PCI read and write request signals M2IREQ and I2MREQ are received by a snoop filter block 306, which contains a line buffer storing the last line accessed by a PCI cycle. As long as a PCI request is directed to an address contained in the line buffer, snoops to the L1 cache in the CPU 100 or the L2 cache 104 are unnecessary. An I2MSNOOP block 312 prevents a PCI-to-memory write cycle from proceeding when a snoop to the L1 or L2 cache is needed by disabling an AND gate 314, whose other input is connected to the signal I2MREQ. The output of the AND gate 314 is connected to the PCI-to-memory write request input of the arbiter 302.

A PCI read cycle is snooped at the same time it is requested to the arbiter 302. If the PCI read cycle hits a modified line in either the L1 cache or the L2 cache, the PCI-to-memory read request is aborted and rerun at a later time. The PCI-to-memory read request is aborted by a M2ISNOOP block 308, which asserts a signal CLRI2M. The PCI-to-memory request is reasserted by the M2ISNOOP block 308 after a snoop write back cycle has occurred to ensure that the proper data is read from main memory 110. Thus, the signal M2IREQ and a signal REREAD from the M2ISNOOP block 308 are provided to the inputs of a two-input OR gate 310, whose output is connected to the PCI-to-memory read request input of the arbiter 302.

Depending upon which cycle has priority, the memory arbiter 302 asserts one of signals P2M, M2P, I2M, M2I, and RFSH. The memory arbiter 302 utilizes a fixed priority scheme with exceptions. The general priority is as follows in descending order: second refresh request, P2M write request, M2P read request, I2M write request, M2I read request, and first refresh request. The second refresh request indicates that two refreshes are outstanding. However, several exceptions exist to this general priority scheme. For an example of how such a modified fixed priority scheme can be implemented, refer to patent application Ser. No. 08/324, 011, entitled "System for Arbitrating Access to Memory," filed Oct. 14, 1994, which is hereby incorporated by reference.

Figure 5:
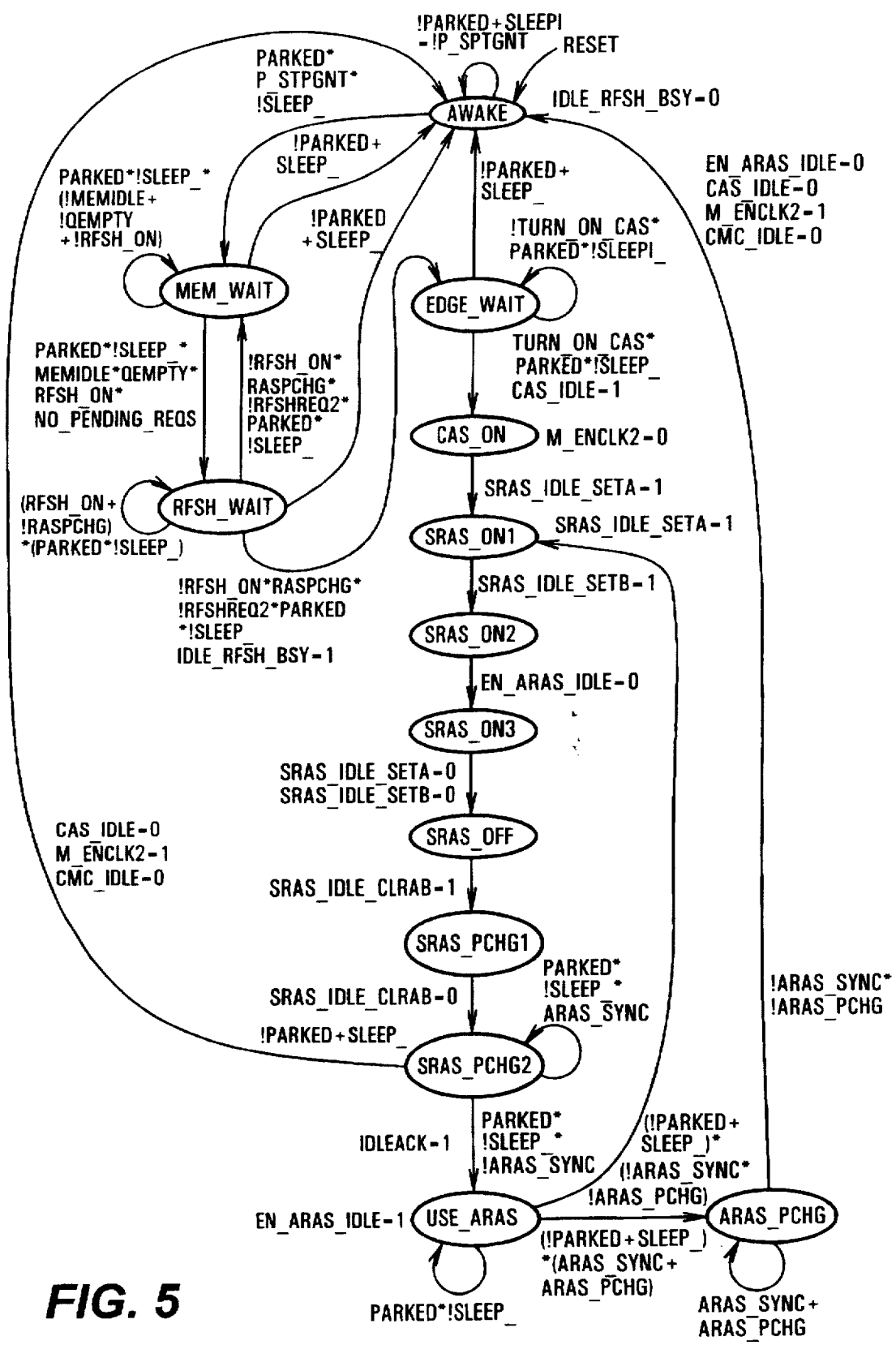
FIG. 5 is a state diagram of a state machine of a power management controller in the memory controller of FIGS. 3 and 4.

Referring to FIG. 5, a state diagram of the state machine 424 in the IDLE mode controller 402 is shown. On assertion of the system reset signal RESET, the state machine 424 enters state AWAKE. On assertion of the signal RESET, the following signals are initialized low: IDLEACK, IDLE_RFSH_BSY, FORCE_RFSH, CAS_IDLE, SRAS_IDLE_SETA, SRAS_IDLE_SETB, and SRAS_IDLE_CLRAB. The signal M_ENCLK2 is initialized high.

The state machine 424 remains in state AWAKE until the signals PARKED, P_STPGNT, and !SLEEP_ are asserted high. In state AWAKE, the signal IDLE_RFSH_BSY is maintained low to indicate that the state machine 424 is not in IDLE or STANDBY mode. If the signals PARKED and P_STPGNT are asserted, which indicates that the CPU-PCI bridge 106 is parked on the PCI bus 112 and the CPU 100 is in STOP GRANT state, and the signal SLEEP_ is asserted low, the state machine 424 transitions to state MEM_WAIT. All state transitions occur on the rising edge of the signal CLKI if the signal PCICLK_IDLE is deasserted low. In the ensuing description of the state machine 424, the combination of the rising edge of the signal CLKI and the signal PCICLK_IDLE being deasserted low will be referred to as "state machine clock" for brevity.

In state MEM_WAIT, the state machine 424 waits for the MCON 202 to go idle and for all queues in the CPU-PCI bridge 106 to be emptied. The MCON 202 being idle is indicated by the signal MEMIDLE being asserted. The queues being empty is indicated by a signal QEMPTY being asserted, which is true if all three of the signals Q_I2MQEMPTY, Q_P2MQEMPTY and Q_P2IQEMPTY are asserted high. In state MEM_WAIT, the state machine 424 also waits for the assertion of the signal RFSH_ON by the refresh state machine 414 to indicate the occurrence of a refresh cycle. The state machine 424 also checks to determine if there are any pending requests for the main memory 110. If there are none, a signal NO_PENDING_REQS is asserted high. If a refresh request is not asserted and the signal ENDCOUNT is deasserted low, indicating that the refresh time interval has not yet elapsed, the state machine 424 drives the signal FORCE_RFSH high to force a refresh request. Thus, if the state machine 424 is in state MEM_WAIT, the signals ENDCOUNT and RFSH_ON are deasserted low, and the signals NO_RFSH_REQS, ARBEN, QEMPTY and NO_PENDING_REQS are asserted high, the signal FORCE_RFSH is asserted high on the next rising edge of the signal CLKI.

If the signals PARKED, !SLEEP_, MEMIDLE, QEMPTY, RFSH_ON and NO_PENDING_REQS are asserted high, the state machine 424 transitions from state MEM_WAIT to state RFSH_WAIT on the next state machine clock. However, if the CPU-PCI bridge 106 is no longer parked or if the signal SLEEP_ is deasserted, the state machine 424 returns from state MEM_WAIT back to state AWAKE. Otherwise, if any of the signals MEMIDLE, QEMPTY, or RFSH_ON is deasserted low, the state machine 424 remains in state MEM_WAIT.

In state MEM_WAIT, the state machine 424 waits for a refresh request to be asserted to guarantee that any RAS signals which were left asserted in previous cycles for faster CPU reads get deasserted. In state RFSH_WAIT, the state machine 424 waits for the RAS precharge time to elapse, which is indicated by the signal RASPCHG transitioning from a low state to a high state. In state RFSH_WAIT, if either of the signals PARKED or SLEEP_ is deasserted, the state machine 424 transitions back to state AWAKE.

If, however, the signals PARKED and !SLEEP_ are both asserted high, and either the signal RFSH_ON is asserted high indicating that a refresh cycle is progressing or the signal RASPCHG is deasserted low indicating that the RAS precharge time has not elapsed yet, the state machine 424 remains in state RFSH_WAIT. However, if the second refresh request signal RFSHREQ2 is asserted high, and the signals !SLEEP_, PARKED, RASPCHRG, and !RFSH_ON are all driven high, the state machine 424 transitions from state RFSH_WAIT back to state MEM_WAIT to process the second refresh request.

If the signals PARKED, !SLEEP_, !RFSH_REQ2, RASPCHG, and !RFSH_ON are all asserted high, indicating that a second refresh request has not come in, the RAS precharge time has been satisfied, and the current refresh cycle has completed, the state machine 424 transitions from state RFSH_WAIT to state EDGE_WAIT. In the transition, the signal IDLE_RFSH_BSY is asserted high to indicate that the IDLE mode controller 402 is entering IDLE mode, and the signal IDLE_RFSH_BSY is provided to the memory controller state machine 418 to disable the ARBEN signal. Once the signal IDLE_RFSH_BSY is asserted high, it is maintained high by the state machine 424 until the state machine returns to state AWAKE.

Figure 7:
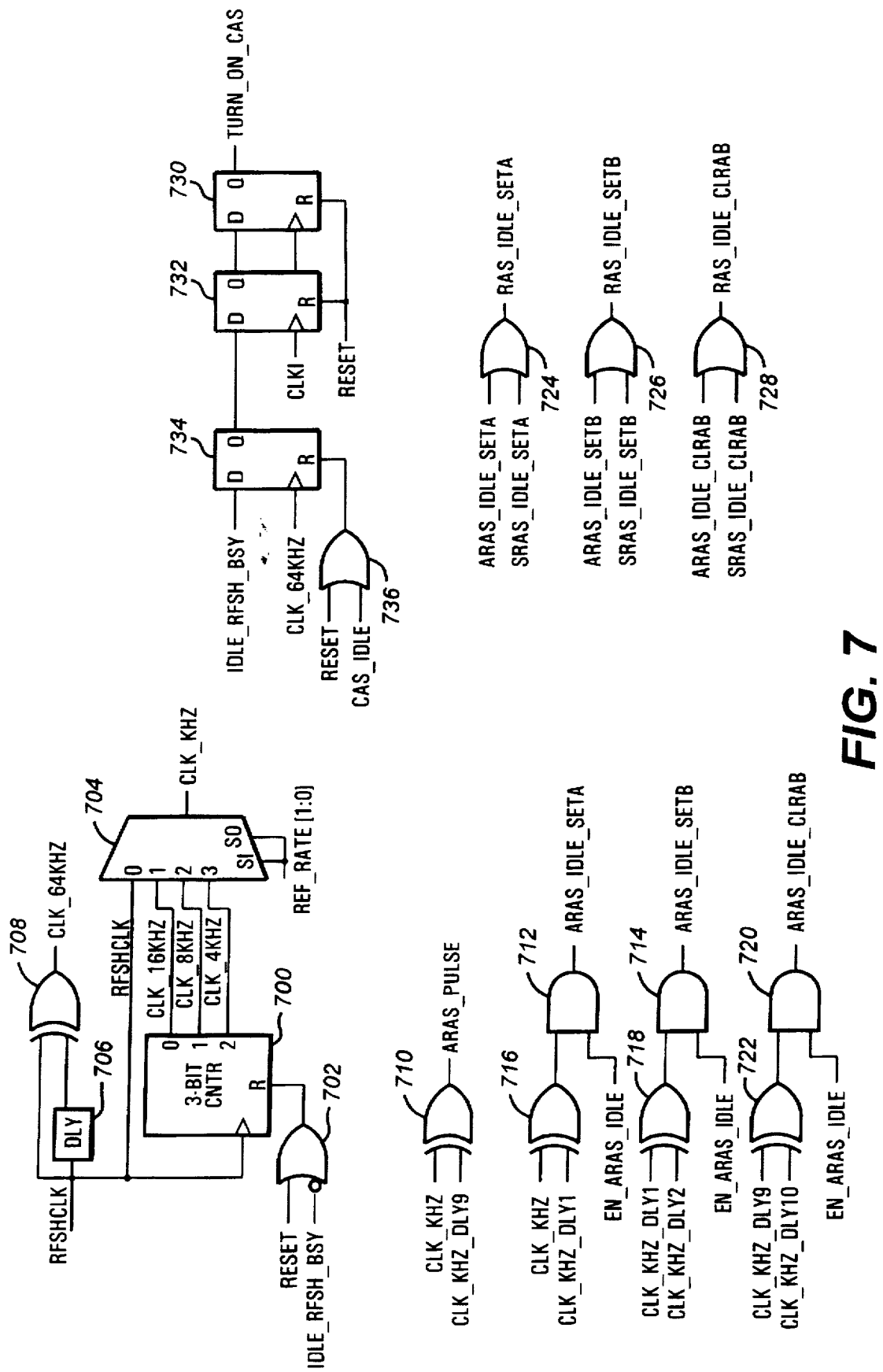
FIG. 7 is a logic diagram of a low power refresh generator located in the memory controller of FIGS. 3 and 4.

From state EDGE_WAIT, the state machine 424 transitions back to state AWAKE if either of the signals !PARKED or SLEEP_ is deasserted. In state EDGE_WAIT, the state machine 424 waits for an edge of the clock RFSHCLK so that the state machine 424 can cleanly enable the asynchronous pulses which are generated off both the rising and falling edges of the clock RFSHCLK. While the signals PARKED and !SLEEP_ are asserted and a signal TURN_ON_CAS is deasserted, the state machine 424 remains in state EDGE_WAIT. If the signals PARKED and !SLEEP_ and the signal TURN_ON_CAS is asserted high, the state machine 424 transitions from state EDGE_WAIT to state CAS_ON. The signal TURN_ON_CAS indicates that an edge of the clock RFSH_CLK has occurred. Generation of the signal TURN_ON_CAS is shown in FIG. 7 below.

In the transition from state EDGE_WAIT to state CAS_ON, the signal CAS_IDLE is set high, which causes the signal CAS_IDLE_SETAB to pulse high for one state machine clock period for setting the M_CASA[7:0]_ and M_CASB[7:0]_ signals low. The signals M_CASA[7:0]_ and M_CASB[7:0]_ remain asserted low to enable low power CBR refresh cycles. Once set high, the signal CAS_IDLE remains high until cleared.

In state CAS_ON, the signal M_ENCLK2 is set low while the signal PCICLK_IDLE is deasserted low to disable the clock CLK2. Once set low, the signal M_ENCLK2 remains low until set high again. On the next state machine clock, the state machine 424 transitions from state CAS_ON to state SRAS_ON1. In the transition, the signal SRAS_IDLE_SETA is driven high. In state SRAS_ON1, the signal SRAS_IDLE_SETA is maintained high. On the next state machine clock, the state machine 424 transitions from state SRAS_ON1 to state SRAS_ON2. In the transition, the signal SRAS_IDLE_SETB is set high. The SRAS_IDLE_SETA and SRAS_IDLE_SETB signals are apart by one state machine clock to reduce current spikes on the computer system board. The signals SRAS_IDLE_SETA and SRAS_IDLE_SETB are asserted high to generate the initial synchronous CBR refresh cycle before entering into IDLE mode.

The synchronous refresh cycle is generated because it is possible that the previous refresh cycle occurred 15.6 microseconds ago, in which case, another refresh cycle is needed.

On the next state machine clock, the state machine 424 transitions from state SRAS_ON2 to state SRAS_ON3. The signals SRAS_IDLE_SETA and SRAS_IDLE_SETB are maintained asserted in state SRAS_ON3. In the transition from state SRAS_ON2 to state SRAS_ON3, the signal EN_ARAS_IDLE is cleared low if it was originally high. The signal EN_ARAS_IDLE may be set high if the state machine 424 had transitioned to state SRAS_ON1 from state USE_ARAS rather than state CAS_ON. As explained earlier, assertion of the signal EN_ARAS_IDLE enables the assertion of internal asynchronous RAS set signals ARAS_IDLE_SETA, ARAS_IDLE_SETB, and ARAS_IDLE_CLRAB in the low power refresh generator 410. The signals ARAS_IDLE_SETA, ARAS_IDLE_SETB, and ARAS_IDLE_CLRAB are used to generate the RAS set signals RAS_IDLE_SETA, RAS_IDLE_SETB, and RAS_IDLE_CLRAB, respectively, for generating RAS pulses for low power CBR refresh cycles.

On the next state machine clock, the state machine 424 transitions from state SRAS_ON3 to state SRAS_OFF. In this transition, the synchronous RAS set signals SRAS_IDLE_SETA and SRAS_IDLE_SETB are cleared low. On the next state machine clock, the state machine 424 transitions from state SRAS_OFF to state SRAS_PCHG1. In the transition, the synchronous RAS clear signal SRAS_IDLE_CLRAB is asserted high. This causes the low power refresh generator 410 to assert the signal RAS_IDLE_CLRAB to the memory interface block 412 for clearing the RAS signals M_RASA|7:0|_ and M_RASB|7:0|_. State SRAS_PCHG1 begins the RAS precharge period for the initial synchronous CBR refresh cycle.

From state SRAS_PCHG1, the state machine 424 transitions to state SRAS_PCHG2 on the next state machine clock. In the transition, the synchronous RAS clear signal SRAS_IDLE_CLRAB is cleared low. State SRAS_PCHG2 extends the RAS precharge period. In state SRAS_PCHG2, if either of the signals PARKED or SLEEP_ is deasserted, the state machine 424 transitions from state SRAS_PCHG2 back to state AWAKE to exit from IDLE mode. In the transition from state SRAS_PCHG2 back to state AWAKE, the signal M_ENCLK2 is asserted high to re-enable the clock CLK2, the signal IDLEACK is cleared low to come out of IDLE mode, and the signal CAS_IDLE is deasserted high to pulse the signal CAS_IDLE_CLRAB high for one state machine clock period to deassert the M_CASA|7:0|_ and M_CASB|7:0|_ signals. States SRAS_PCHG1 and SRAS_PCHG2 guarantee RAS precharge time in case the state machine 424 needs to exit and relinquish control back to the main memory controller.

Otherwise, if the signal PARKED and the signal !SLEEP_ are asserted, the state machine 424 remains in state SRAS_PCHG2 while the signal ARAS_SYNC is asserted high. The signal ARAS_SYNC is delayed from the signal ARAS_PULSE by two CLKI periods. The signal ARAS_PULSE is asserted by the low power refresh generator 410 in response to the assertion of the refresh clock RFSHCLK.

When the signal ARAS_SYNC drops low, the state machine 424 transitions to state USE_ARAS. In the transition, the signal IDLEACK is driven high. The state machine 424 remains in state USE_ARAS while the signals PARKED and !SLEEP_ are asserted, indicating that the IDLE mode controller 402 continues to remain in IDLE mode. In response to the state machine 424 being in state USE_ARAS, the signal EN_ARAS_IDLE is set high to enable the generation of asynchronous RAS pulses from the refresh clock RFSHCLK. The signal EN_ARAS_IDLE remains set high until the CPU-PCI bridge 106 gets unparked from PCI bus 112 or the signal SLEEP_ is deasserted.

While the state machine 424 is in state USE_ARAS, it is possible that the signal STANDBY_ is asserted to cause the computer system to transition to STANDBY mode. In STANDBY mode, the external reference clock CLKI is disabled. As a result, the state of the state machine 424 is frozen in state USE_ARAS, with the output signals being maintained at their driven values. Thus, the signals driven by the IDLE mode controller 402 remain at the same values in the IDLE and STANDBY modes. In STANDBY mode, the low power refresh generator 410 continues to generate refresh cycles to maintain the state of the DRAMs 110.

If either of the signals PARKED or SLEEP_ are deasserted, then the state machine 424 transitions out of state USE_ARAS. If the signal ARAS_SYNC is deasserted and a signal ARAS_PCHG is deasserted, the state machine 424 transitions to state SRAS_ON1. The signal ARAS_PCHG is the signal ARAS_SYNC delayed by two state machine clocks. Thus, if both signals ARAS_SYNC and ARAS_PCHG are deasserted low, that indicates that an asynchronous RAS pulse is not currently being generated by the low power refresh generator 410; as a result, the state machine 424 transitions back to state SRAS_ON1 to generate a synchronous CBR refresh cycle before exiting IDLE mode.

If either of the signals ARAS_SYNC or ARAS_PCHG is asserted high, then the state machine 424 transitions from state USE_ARAS to state ARAS_PCHG. The state machine 424 remains in state ARAS_PCHG while either signal ARAS_SYNC or ARAS_PCHG is asserted to wait for the asynchronous RAS pulses to finish. The signal ARAS_PCHG ensures that the minimum RAS precharge time is satisfied if the signal PARKED or the signal SLEEP_ is deasserted while an asynchronous RAS pulse is on. When both signals ARAS_SYNC and ARAS_PCHG are deasserted, the state machine 424 transitions from state ARAS_PCHG back to state AWAKE. In the transition out of IDLE mode, the signal M_ENCLK2 is asserted high, the signal IDLEACK is deasserted low, the signal CAS_IDLE is deasserted low to pulse the signal CAS_IDLE_CLRAB high for one state machine clock period, and the signal EN_ARAS_IDLE is cleared low.

Figure 11:
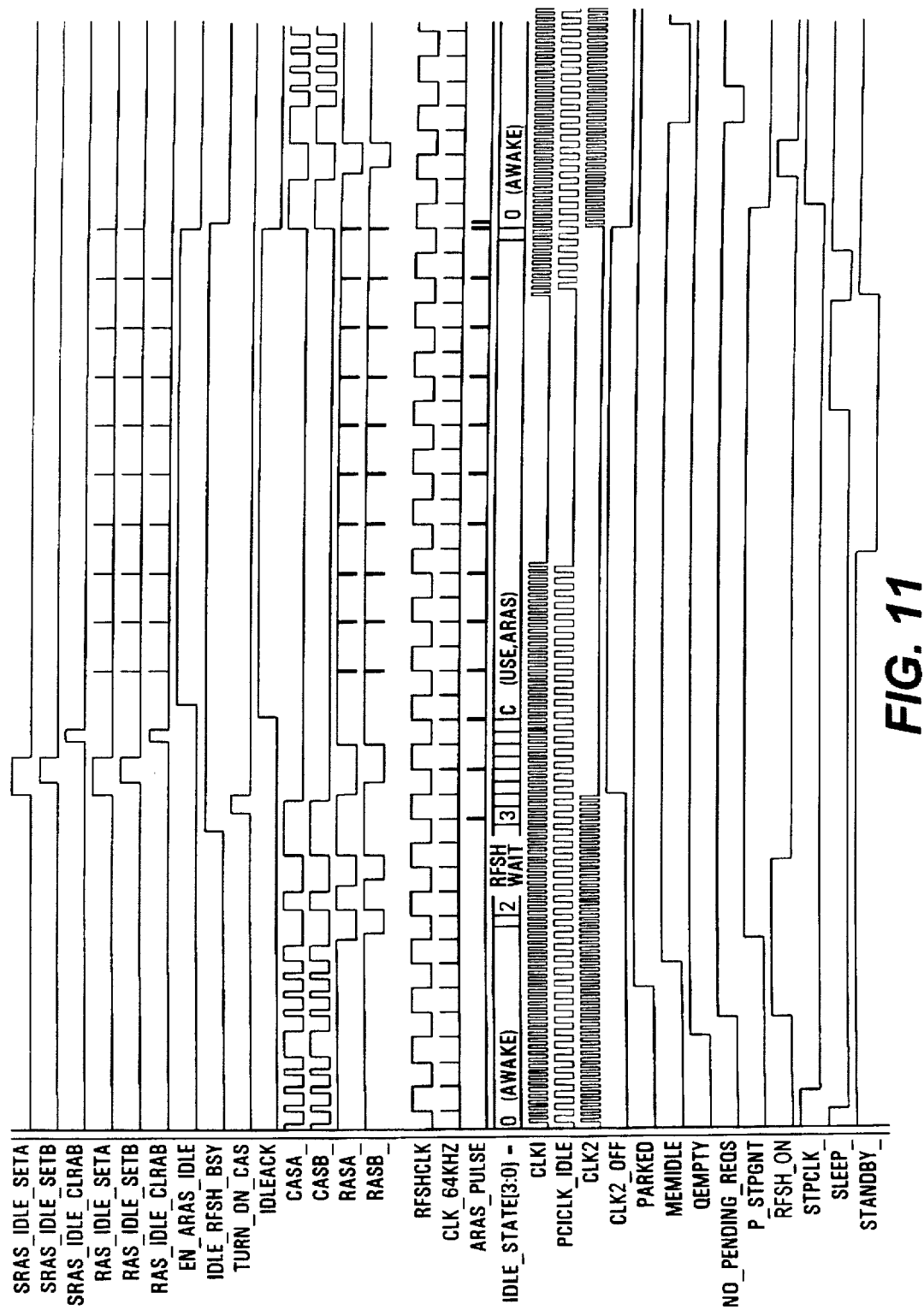
FIG. 11 is a timing diagram of operation according to the present invention.

A timing diagram of the operation is provided in FIG. 11. In the illustrated sequence, the queues are empty, but a refresh cycle generated by the memory controller is completing when transition to idle is noted. After the completion of the refresh cycle, the forced synchronous refresh cycle is provided. After that operation, refresh cycles are generated from pulses on the CLK_64 kHz signal as the CAS_ signals are low and the CLK_64 kHz signal causes pulses every other pulse in the RAS_ signals. After a period of this asynchronous refreshing, system activity is detected and operation changes from the asynchronous operation to refreshes provided by the memory controller. Therefore the transitions from normal, memory-controller-based synchronous refresh operations to asynchronous refresh operations and back to memory-controlled-based refresh operations are clearly shown.

Thus, in summary, the state machine 424 detects for the condition where the signal SLEEP_ is asserted and the CPU-PCI bridge 106 is parked on the PCI bus 112. When that condition is detected, the state machine 424 waits for the MCON 202 to go idle and for all queues in the CPU-PCI bridge 106 to empty. If a refresh cycle is not in progress, the state machine 424 asserts the signal FORCE_RFSH to force the generation of a refresh request. The state machine 424 waits for the refresh cycle to complete and determines if the signal SLEEP_ is still asserted and the CPU-PCI bridge 106 is still parked on the PCI bus 112 before proceeding. If these conditions are true, the state machine 424 next waits for an edge of the asynchronous clock RFSHCLK before proceeding. After the rising edge of the asynchronous clock RFSHCLK is detected, the signal M_ENCLK2 is deasserted to disable the internal clock tree of the CPU-PCI bridge 106. A synchronous refresh cycle is then generated using the CAS_IDLE_SETAB, SRAS_IDLE_SETA, SRAS_IDLE_SETB and SRAS_IDLE_CLRAB signals. As the synchronous refresh cycle is triggered off the signal RFSHCLK, this allows asynchronous refresh cycles based off the clock RFSHCLK to be generated safely without violating the DRAM RAS precharge time. After generation of the synchronous refresh cycle, the state machine 424 asserts the signal EN_ARAS_IDLE, which enables the low power refresh generator 410 to generate RAS pulses off the clock RFSH_CLK. The signal EN_ARAS_IDLE remains asserted and the refresh generator 410 remains enabled even when the signal STANDBY_ is asserted to transition to STANDBY mode. When the signal SLEEP_ is deasserted or the CPU-PCI bridge 106 becomes unparked, the state machine 424 checks to see if an asynchronous refresh cycle is currently in progress. If so, it waits for the cycle to complete and for the RAS precharge time to be satisfied. If, however, an asynchronous refresh cycle is not detected when the signal SLEEP_ is deasserted or the CPU-PCI bridge 106 becomes unparked, the state machine 424 produces another synchronous refresh cycle to ensure a safe transition from asynchronous refresh generation back to synchronous refresh generation.

Figure 6:
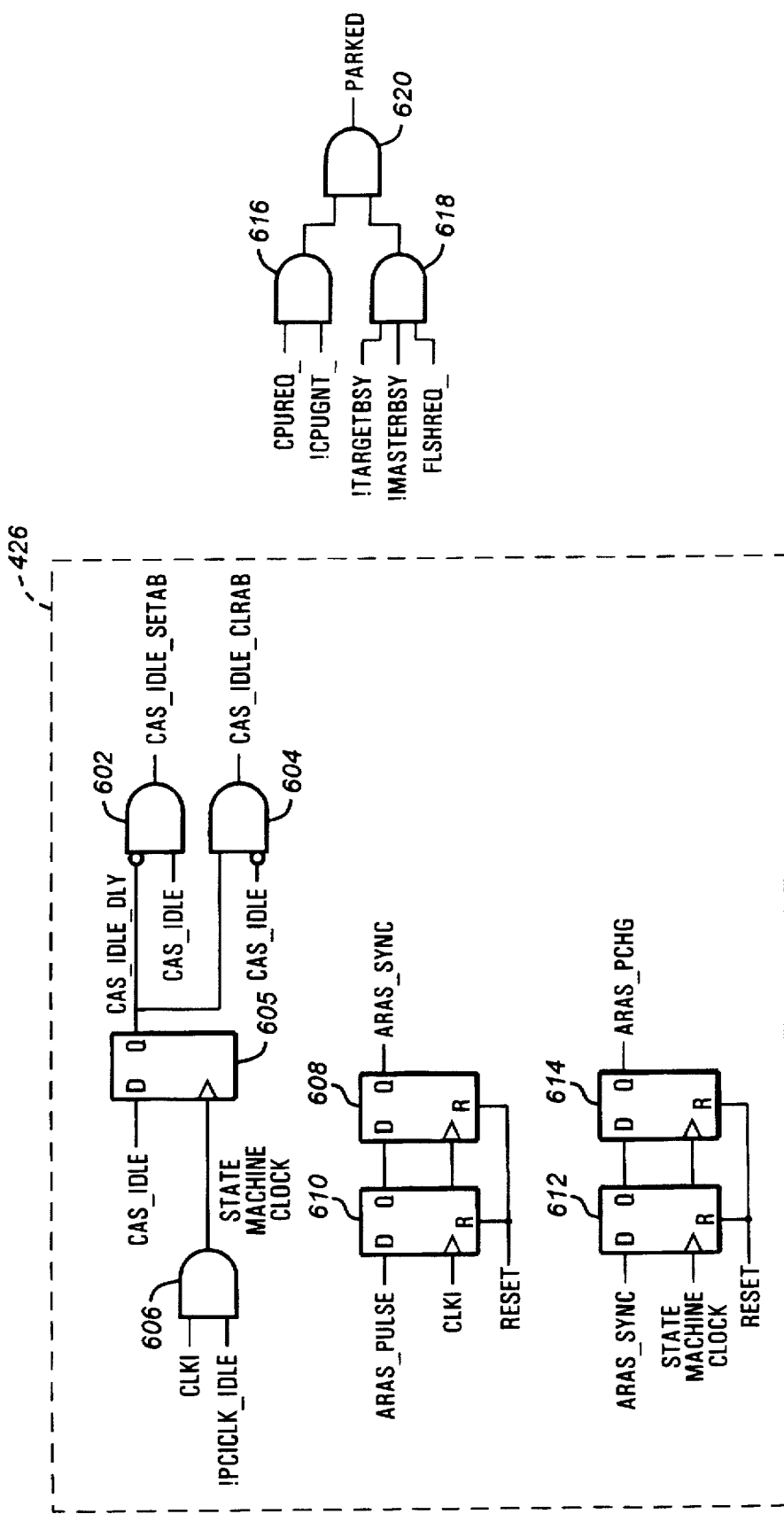
FIG. 6 is a logic diagram of the power management controller of FIG. 5.

Referring to FIG. 6, a schematic diagram is shown of the peripheral logic 426 in the IDLE mode controller 402 and logic for generating the signal PARKED in the ICON 204. The signals CAS_IDLE_SETAB and CAS_IDLE_CLRAB are generated by two-input AND gates 602 and 604, respectively. The inputs of the AND gate 602 receive the signal CAS_IDLE and the inverted state of a signal CAS_IDLE_DLY, while the inputs of the AND gate 604 receive the signal CAS_IDLE_DLY and the inverted state of the signal CAS_IDLE. The signal CAS_IDLE_DLY is provided by the non-inverting output of a D-type flip-flop 604, whose D input receives the signal CAS_IDLE. The clock input of the flip-flop 604 is connected to the output of an AND gate 608 whose inputs receive the signals CLKI and the inverted state of the signal PCICLK_IDLE. The output of the AND gate 608 provides the aforementioned state machine clock.

The signal ARAS_SYNC is provided by the non-inverting output of a D-type flip-flop 608, whose D input is connected to the non-inverting output of a D-type flip-flop 610. The D input of the flip-flop 610 receives the signal ARAS_PULSE generated by the low power refresh generator 410, and both flip-flops 610 and 608 are clocked on the rising edge of the signal CLKI and reset low by the signal RESET. The signal ARAS_SYNC is provided to the D input of a D-type flip-flop 612, whose non-inverting output is connected to the D input of a D-type flip-flop 614. The non-inverting output of the flip-flop 614 produces the signal ARAS_PCHG. The clock inputs of the flip-flops 612 and 614 receive the state machine clock and both flip-flops 612 and 614 are reset by the signal RESET.

The logic for generating the signal PARKED consists of AND gates 616, 618 and 620, which reside in the ICON 204. The signal PARKED is provided at the output of an AND gate 620, whose inputs are connected to the outputs of the AND gates 616 and 618. The inputs of the AND gate 616 receive the signal CPUREQ_ and the inverted state of the signal CPUGNT_. The signal CPUREQ_ is asserted low to the ICON 204 by the PCON 200 to request access to the PCI bus 112. In response to the request, the MISC 118 asserts a signal CPUGNT_ low. If the signal CPUREQ_ is deasserted, but the signal CPUGNT_ is asserted by the MISC 118, then that indicates that the CPU-PCI bridge 106 is parked on the PCI bus 112.

The inputs of the AND gate 618 receive the inverted state of a signal TARGETBSY, the inverted state of a signal MASTERBSY, and the signal FLSHREQ_. The signal FLSHREQ_ is asserted by the MISC 118 for a flush request to the CPU-PCI bridge 106. The signal TARGETBSY is asserted high if the ICON 204 is currently busy as the target of a cycle on the PCI bus 112. The signal MASTERBSY is asserted high if the ICON 204 is currently busy as a master on the PCI bus 112. Thus, if the CPU-PCI bridge 106 is parked on the PCI bus 112, and the ICON 204 is not busy either as a PCI bus master or slave, and a flush request is not asserted by the MISC 118, the signal PARKED is asserted high.

Referring to FIG. 7, a schematic diagram of logic in the low power refresh generator 410 is shown. As noted earlier, the low power refresh generator 410 receives the refresh clock RFSHCLK. The signal RFSHCLK is provided to the clock input of a three-bit binary counter 700, whose output bit 0 provides a signal CLK_16 KHZ, output bit 1 provides a signal CLK_8 KHZ, and output bit 2 provides a signal CLK_4 KHZ. The signals CLK_16 KHZ, CLK_8 KHZ, and CLK_4 KHZ are 16, 8 and 4 kHz clocks, respectively. The reset input of the counter 700 is connected to the output of an OR gate 702, whose inputs receive the signal RESET and the inverted state of the signal IDLE_RFSH_BSY. Thus, the counter 700 is enabled when in IDLE or STANDBY mode and cleared to all zeros when in RUN or SLEEP mode.

The signals RFSHCLK, CLK_16 KHZ, CLK_8 KHZ, and CLK_4 KHZ are provided to the 0, 1, 2 and 3 inputs of a 4:1 multiplexor 704. The S1 and S0 inputs of the multiplexor 704 are connected to signals REF_RATE|1:0|, respectively, which selects the refresh rate. The output of the multiplexor 704 provides a signal CLK_KHZ, which is the clock signal used inside the low power refresh generator 410. Depending upon the value of the signals REF_RATE [1:0], the low power refresh rate is controlled by a 4 kHz, an 8 kHz, a 16 kHz, or a 32 kHz clock.

The signal RFSHCLK is also provided to the input of a delay block 706, whose output is connected to one input of an exclusive OR gate 708. The delay block 706 has a minimum delay time of 10 ns. The other input of the exclusive OR gate 708 receives the signal RFSHCLK. The output of the exclusive OR gate 708 produces a signal CLK_64 KHZ, which is a 64 kHz clock based on the signal RFSHCLK.

A series of delayed signals are produced off of the signals CLK_KHZ. These signals are CLK_KHz_DLY1, which is the signal CLK_KHZ through one delay block; a signal CLK_KHZ_DLY2, which is the signal CLK_KHZ through two delay blocks; a signal CLK_KHZ_DLY9, which is the signal CLK_KHZ through nine delay blocks; and a signal CLK_KHZ_DLY10, which is the signal CLK_KHZ through 10 delay blocks. Each delay block has a minimum delay of 10 ns and a maximum delay of 40 ns.

The signals CLK_KHZ and CLK_KHZ_DLY9 are provided to the inputs of an exclusive OR gate 710 to provide the asynchronous RAS pulse signal ARAS_PULSE. Depending upon the delay through each delay block, the pulse width of the signal ARAS_PULSE ranges between 80 ns and 320 ns. The signal ARAS_PULSE is driven back to the IDLE mode controller 402 for generating the signal ARAS_SYNC and ARAS_PCHG.

While the CPU-PCI bridge 106 is in IDLE or STANDBY mode, RAS pulses are generated periodically to perform asynchronous CBR refresh cycles. As discussed earlier, the CASA_ and CASB_ signals are maintained low throughout IDLE and STANDBY mode, and the CBR refresh cycles are generated by pulsing the RASA_ and RASB_ signals low. To that end, asynchronous RAS set signals ARAS_IDLE_SETA and ARAS_IDLE_SETB are generated by AND gates 712 and 714, respectively. Both the signals ARAS_IDLE_SETA and ARAS_IDLE_SETB are 10 to 40 ns pulse signals. One input of the AND gate 712 is connected to the output of an exclusive OR gate 716, and the other input receives the signal EN_ARAS_IDLE generated by the IDLE mode controller 402 to enable generation of the asynchronous RAS set signals. The inputs of the exclusive OR gate 716 receive signals CLK_KHZ and CLK_KHZ_DLY1.

Similarly, one input of the AND gate 714 is connected to the output of an exclusive OR gate 718, whose inputs receives signals CLK_KHZ_DLY1 and CLK_KHZ_DLY2. The other input of the AND gate 714 receives the signal EN_ARAS_IDLE. The signal ARAS_IDLE_SETB is delayed by 10 to 40 ns with respect to the signal ARAS_IDLE_SETA to stagger the pulsing of the RASA_ and RASB_ signals to reduce current spikes.

A minimum of 80 ns from the pulsing of the signal ARAS_IDLE_SETB, the signal ARAS_IDLE_CLRAB is pulsed high to deassert the RASA_ and RASB_ signals. The signal ARAS_IDLE_CLRAB is provided by an AND gate 720, whose first input receives the signal EN_ARAS_IDLE and whose second input is connected to the output of an exclusive OR gate 722. The inputs of the exclusive OR gates 722 receive signals CLK_KHZ_DLY9 and CLK_KHZ_DLY10.

The asynchronous RAS set and clear signals are combined in the low pulse refresh generator 410 with the synchronous RAS set and clear signals provided by the IDLE mode controller 402. Thus, the signals ARAS_IDLE_SETA and SRAS_IDLE_SETA are provided to the inputs of an OR gate 724 to produce the signal RASA_IDLE_SETA. The signals ARAS_IDLE_SETB and RAS_IDLE_SETB are provided to the inputs of an OR gate 726 to produce the signal RAS_IDLE_SETB. The signals ARAS_IDLE_CLRAB and SRAS_IDLE_CLRAB are provided to the inputs of an OR gate 728 to generate the signal RAS_IDLE_CLRAB. The signals RAS_IDLE_SETA, RAS_IDLE_SETB, and RAS_IDLE_CLRAB are provided to the memory interface block 412.

As discussed above, the signal TURN_ON_CAS is used to transition the state machine 424 from state EDGE_WAIT to state CAS_ON. The signal TURN_ON_CAS is provided by the non-inverting output of a D-type flip-flop 730, whose D input is connected to the non-inverting output of a D-type flip-flop 732. Both flip-flops are clocked by the signal CLKI and reset by the signal RESET. The D input of the flip-flop 732 is connected to the non-inverting output of a D-type flip-flop 734, whose D input receives the signal IDLE_RFSH_BSY. The clock signal of the flip-flop 734 receives the signal CLK_64 KHZ, and the reset input is connected to the output of an OR gate 736. The inputs of the OR gates 736 receive the signals RESET and CAS_IDLE. The signal CAS_IDLE is used to reset the flip-flop 734 to prevent the signal TURN_ON_CAS from being asserted for a second time. The signal TURN_CAS_ON is asserted on the first rising edge of the clock CLK_64 KHZ after the signal IDLE_RFRSH_BSY is asserted.

Figure 9:
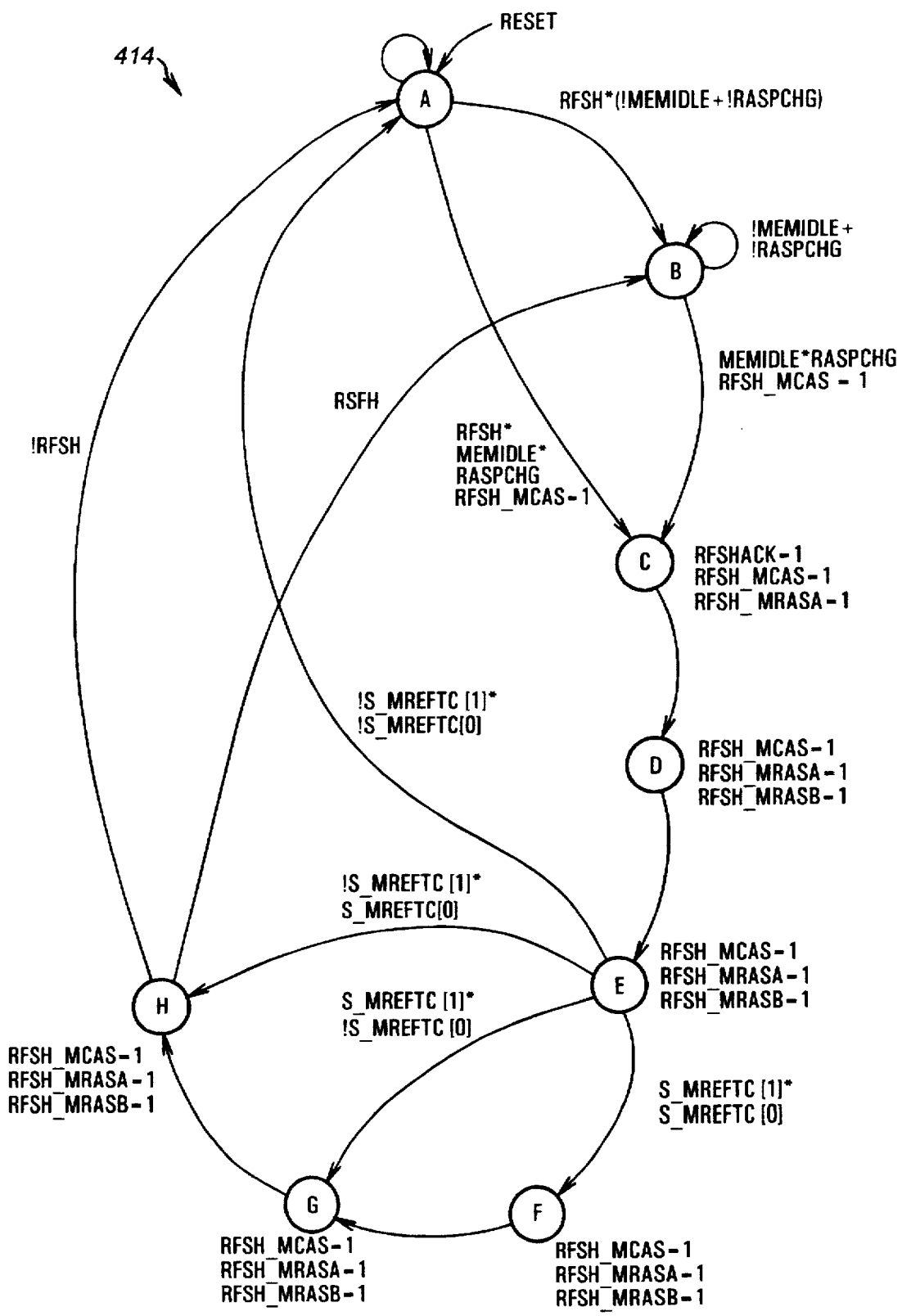
FIG. 9 is a state diagram of the refresh state machine in the memory controller of FIG. 4.

Referring to FIG. 9, a state diagram is shown of the refresh state machine 414, which produces the memory refresh cycles when the computer system is not in IDLE or STANDBY mode. The refresh state machine 414 is clocked off the signal CLK2, which is disabled in the IDLE and STANDBY modes. All transitions of the refresh state machine 414 occur on the rising edge of the signal CLK2. Initially, on assertion of the signal RESET, the state machine 414 transitions to idle state A, where it remains until the signal RFSH is asserted by the memory arbiter 302 to indicate that a refresh request has been granted access to the memory 110. The signal RFSH_ON is deasserted low when the state machine 414 is in state A, but it is asserted high if the state machine 414 transitions to any of the other states. The signal RFSH_ON indicates that a refresh cycle is in progress.

If the signal RFSH is asserted high, but either of signal MEMIDLE or RASPCHG is deasserted low, the state machine 414 transitions from state A to state B. The signal MEMIDLE being deasserted low indicates that the memory controller state machine 418 is busy. The signal RASPCHG being deasserted low indicates that the RAS precharge time has not yet been satisfied from a previous memory cycle. If, however, the signal RFSH is asserted high and both signals MEMIDLE and RASPCHG are asserted high, the state machine 414 transitions from state A to state C. Similarly, from state B, the state machine 414 transitions to state C when the signals MEMIDLE and RASPCHG are asserted high. In the transition from state A or B to state C, the signal RFSH_MCAS is asserted high to enable the activation of the MCASA_ and MCASB_ signals for a CBR refresh cycle.

In state C, a refresh acknowledge signal RFSHACK is asserted high and provided to the memory controller state machine 418 as an acknowledge that a refresh cycle is in progress and that the CASA_ and CASB_ signals have been activated. In state C, the signal RFSH_MCAS is maintained high and the signal RFSH_MRASA is asserted high to activate the RASA_ signals.

On the next rising edge of the signal CLK2, the state machine 414 transitions from state C to state D. In state D, the signals RFSH_MCAS and RFSH_MRASA are maintained high, and the signal RFSH_MRASB is asserted high to activate the RASB_ signals. The signals RFSH_MRASA and RFSH_MRASB are staggered by one CLK2 period to reduce current spikes in performing the memory refresh cycles.

On the next rising edge of the signal CLK2, the state machine 414 transitions from state D to state E. In state E, the signals RFSH_MCAS, RFSH_MRASA, and RFSH_MRASB are maintained high. In state E, one of four transitions can occur, depending upon the programmed RAS pulse width. The RAS pulse width is programmed with bits S_MREFTC[1:0]. If both bits are programmed to zeros, the state machine 414 transitions from state E to state A on the next rising edge of the signal CLK2. The bits S_MREFTC[1:0] being programmed to the value 00 indicate a RAS pulse width of two clocks. If the bits S_MREFTC[1:0] are programmed to the value 01, indicating a RAS pulse width of three clocks, the state machine 414 transitions from state E to state H on the next rising edge of the signal CLK2. If the signals S_MREFTC[1:0] are programmed to the value 10, indicating a RAS pulse width of four clocks, the state machine 414 transitions from state E to state G on the next rising edge of the signal CLK2. Finally, if the signals S_MREFTC[1:0] are programmed to the value 11, then the RAS pulse width is five clocks and the state machine transitions from state E to state F on the next rising edge of the signal CLK2.

The state machine 414 transitions from state F to state G to state H on each subsequent rising edge of the signal CLK2. The signals RFSH_MCAS, RFSH_MRASA, and RFSH_MRASB are maintained high in states F, G and H. From state H, the state machine 414 transitions back to state A if the signal RFSH is deasserted low. However, if the signal RFSH is asserted high, indicating that another refresh request has been granted access to the memory 110, the state machine 414 transitions from state H to state B to begin another CBR refresh cycle.

Figure 10:
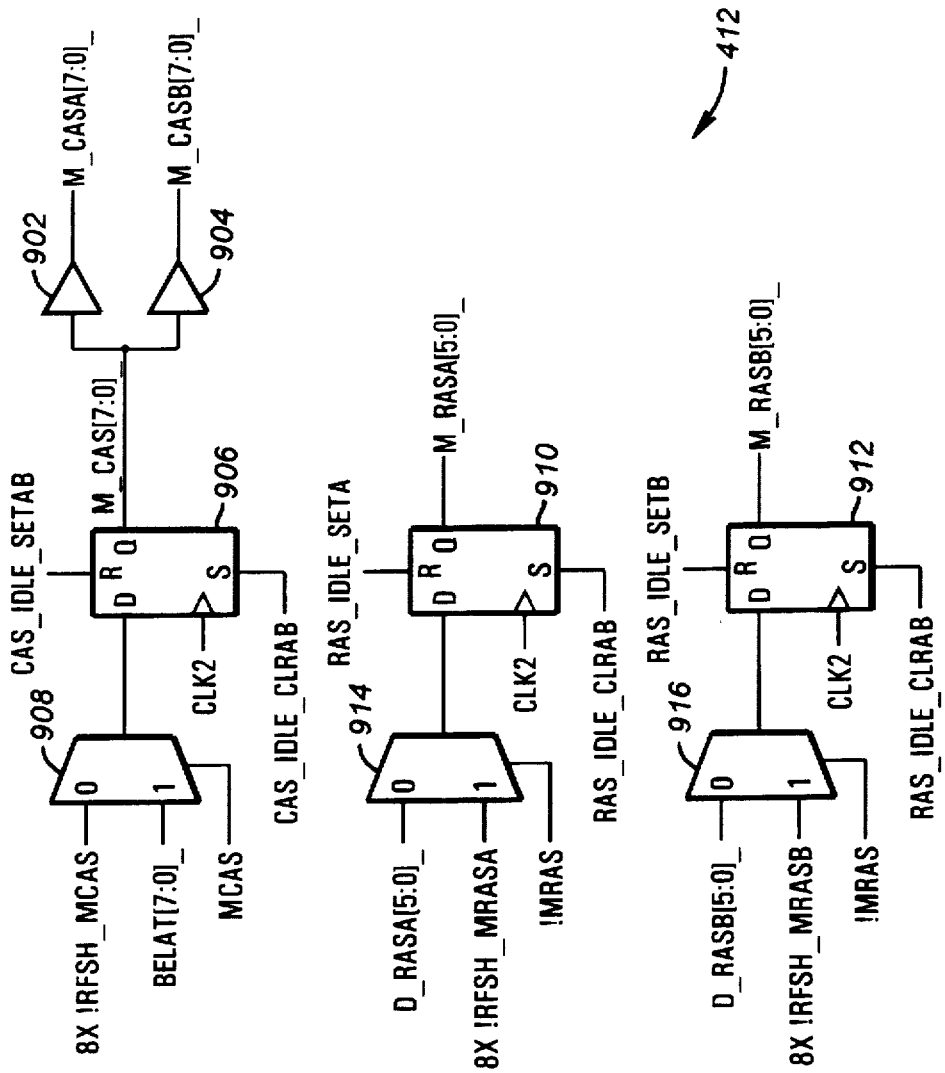

Referring to FIG. 10, portions of the memory interface block 412 are shown. The signals M_CASA|7:0|_ and M_CASB|7:0|_ are driven by buffers 902 and 904, respectively. The inputs of the buffers 902 and 904 are connected to signals M_CAS|7:0|_, which are provided by the non-inverting output of a D-type flip-flop 906. The flip-flop 906 is clocked on the rising edge of the signal CLK2, and has asynchronous set and reset inputs. The reset input receives the signal CAS_IDLE_SETAB, and the set input receives the signal CAS_IDLE_CLRAB. The signals CAS_IDLE_SETAB and CAS_IDLE_CLRAB are asserted to set and reset the CASA_ and CASB_ signals. The D input of the flip-flop 906 is connected to the output of a 16:8 multiplexor 908. The 0 input of the multiplexor 908 receives the inverted state of the signal RFSH_MCAS, repeated eight times. The 1 input of the multiplexor 908 receives signals BELAT|7:0|_, which are the byte enable bits used to control the M_CAS|7:0|_ signals during normal memory cycles. The select input of the multiplexor 908 receives the signal MCAS provided by the memory controller state machine 418.

The signals M_RASA|5:0|_ and M_RASB|5:0|_ are provided by the non-inverting outputs of D-type flip-flops 910 and 912, respectively. Both flip-flops 910 and 912 are clocked on the rising edge of the signal CLK2, and both flip-flops 910 and 912 include asynchronous set and reset inputs. The reset and set inputs of the flip-flop 910 receive the signals RAS_IDLE_SETA and RAS_IDLE_CLRAB, respectively, while the reset and set inputs of the flip-flop 912 receive the signals RAS_IDLE_SETB and RAS_IDLE_CLRAB, respectively. The signals RAS_IDLE_SETA and RAS_IDLE_SETB are used to set the RASA_ and RASB_ signals during IDLE mode to generate refresh cycles. The signal RAS_IDLE_CLRAB is used to during IDLE mode to clear the RASA_ and RASB_ signals.

The D inputs of the flip-flops 910 and 912 are connected to the outputs of 16:8 multiplexors 914 and 916, respectively. The select inputs of both multiplexors 914 and 916 receive the inverted state of the signal MRAS provided by the memory controller state machine 418. The 1 input of the multiplexor 914 receives the inverted state of the signal !RFSH_MRASA, repeated eight times. The 0 input of the multiplexor 914 receives signals D_RASA|5:0|_. The 1 input of the multiplexor 916 receives the inverted state of the signal RFSH_MRASB, repeated eight times, and its 0 input receives signals D_RASB|5:0|_. The signals D_RASA|5:0|_ and D_RASB|5:0|_ are used to control the states of the M_RASA|5:0|_ and M_RASB|5:0|_ signals during normal memory cycles. The signals RFSH_MCAS, RFSH_MRASA, and RFSH_MRASB control the states of the signals M_CASA|7:0|_, M_CASB|7:0|, M_RASA|5:0|_ and M_RASB|5:0|_ during normal memory refresh cycles.

During the IDLE and STANDBY modes, the states of the flip flops 906, 910 and 912 are frozen because the signal CLK2 is disabled. In these low power modes, the signals CAS_IDLE_SETAB, CAS_IDLE_CLRAB, RAS_IDLE_SETA, RAS_IDLE_SETB and RAS_IDLE_CLRAB are used to pulse the M_CASA|7:0|_, M_CASB|7:0|_, M_RASA|5:0|_ and M_RASB|5:0|_ signals.

Thus, what has been described is a computer system having a power management circuit which implements four power levels, from highest power consumption to lowest power consumption: RUN mode, SLEEP mode, IDLE mode, and STANDBY mode. The computer system preferably includes a PCI bus and an ISA bus, with a CPU-PCI bridge to connect the host bus and the PCI bus and a PCI-ISA bridge to connect the PCI bus and the ISA bus. The power management circuit transitions from SLEEP mode to IDLE mode by first determining if the CPU-PCI bridge is parked on the PCI bus and if it is in SLEEP mode. The power management circuit then waits for one refresh period and for all internal queues to empty before checking again to determine if the CPU-PCI bridge is still parked on the PCI bus and if it is still in SLEEP mode. If true, the CPU-PCI bridge transitions to IDLE mode. The power management circuit also performs low power refresh cycles when it is in IDLE or STANDBY mode. In those modes, the memory controller in the CPU-PCI bridge is disabled to conserve power. The power management circuit performs the refresh cycles based off an external asynchronous clock. Further, the power management circuit drives certain PCI bus signals to a certain state to avoid leakage current due to the existence of a mixture of 3.3-bolt and 5-volt components connected to the PCI bus.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A circuit for generating refresh cycles to a memory device in a computer system, the computer system having a memory controller coupled to the memory device, an asynchronous clock and a synchronous clock, and at least a first low power state, the circuit comprising:

means for detecting if the computer system is in the first low power state;

means coupled to said detecting means for disabling the memory controller if the computer system is in the first low power state, wherein the memory controller includes first synchronous refresh generating means receiving the synchronous clock for generating periodic refresh cycles based off the synchronous clock while the computer is not in a low power state; and means coupled to said detecting means and receiving the asynchronous clock for generating periodic refresh cycles based off said asynchronous clock while the computer system is in the first low power state.

2. The circuit of claim 1, further comprising:

second synchronous refresh generating means coupled to said detecting means and receiving the synchronous clock for generating a first synchronous refresh cycle before enabling said asynchronous refresh generating means after the computer system transitions to the first low power state.

3. The circuit of claim 2, wherein the computer system exits from the first low power state in response to an exit condition, and wherein said second synchronous refresh generating means generates a second synchronous refresh cycle based off said synchronous clock in response to said exit condition.

4. The circuit of claim 3, wherein said second synchronous refresh cycle is generated only if an asynchronous refresh cycle is not in progress when said exit condition occurs.

5. The circuit of claim 1, wherein the computer system includes a real time clock, and wherein said asynchronous clock is provided by said real time clock.

6. The circuit of claim 1, wherein the memory device receives row address strobe and column address strobe signals, and wherein said asynchronous refresh generating means includes:
   means for maintaining said column address strobe signals asserted while the computer system is in the first low power state; and
   means for pulsing said row address strobe signals periodically to generate CAS-before-RAS refresh cycles while the computer system is in the first low power state, said row address strobe signals being based off said asynchronous clock.

7. The circuit of claim 1, wherein the computer system has a second low power state which is a lower power consumption state than the first low power state, wherein said synchronous clock is disabled in said second low power state, and wherein said asynchronous refresh generating means continues to generate said periodic refresh cycles based off said asynchronous clock while the computer system is in said second lower power state.

8. A computer system having at least a first low power state, an asynchronous clock and a synchronous clock, comprising:
   a memory device;
   a memory controller coupled to said memory device, wherein said memory controller includes first synchronous refresh generating means receiving the synchronous clock for generating periodic refresh cycles based off the synchronous clock while the computer is not in a low power state; and
   a low power refresh controller coupled to said memory device and memory controller, comprising:
     means for detecting if the computer system is in the first low power state;
     means coupled to said detecting means for disabling said memory controller if the computer system is in the low power state; and
     means coupled to said detecting means and receiving the asynchronous clock for generating periodic refresh cycles to said memory device based off said asynchronous clock while the computer system is in the first low power state.

9. The computer system of claim 8, wherein said low power refresh controller further comprises:
   second synchronous refresh generating means coupled to said detecting means and receiving the synchronous clock for generating a first synchronous refresh cycle before enabling said asynchronous refresh generating means after the computer system transitions to the first low power state.

10. The computer system of claim 9, wherein the computer system exits from the first low power state in response to an exit condition, and wherein said second refresh generating means generates a second synchronous refresh cycle based off said synchronous clock in response to said exit condition.

11. The computer system of claim 10, wherein said second synchronous refresh cycle is generated only if an asynchronous refresh cycle is not in progress when said exit condition occurs.

12. The computer system of claim 8, further comprising:
   a real time clock providing said asynchronous clock.

13. The computer system of claim 8, wherein said memory device receives row address strobe and column address strobe signals, and wherein said asynchronous refresh generating means includes:
   means for maintaining said column address strobe signals asserted while the computer system is in the first low power state; and
   means for pulsing said row address strobe signals periodically to generate CAS-before-RAS refresh cycles while the computer system is in the first low power state, said row address strobe signals being based off said asynchronous clock.

14. The computer system of claim 8, wherein the computer system has a second low power state which is a lower power consumption state than the first low power state, wherein the synchronous clock is disabled in said second low power state, and wherein said asynchronous refresh generating means continues to generate said periodic refresh cycles based off said asynchronous clock while the computer system is in said second lower power state.

15. A method of generating refresh cycles to a memory device in a computer system, the computer system having a memory controller coupled to the memory device, at least a first low power state, an asynchronous clock and a synchronous clock, the method comprising the steps of:
   detecting if the computer system is in the first low power state;
   disabling the memory controller if the computer system is in the first low power state, wherein the memory controller receives the synchronous clock for generating periodic refresh cycles based off the synchronous clock while the computer is not in a low power state;
   receiving the asynchronous clock; and
   generating periodic refresh cycles based off the asynchronous clock while the computer system is in the first low power state.

16. The method of claim 15, further comprising the step of:
   generating a first synchronous refresh cycle before performing said asynchronous refresh generating step after the computer system transitions to the first low power state.

17. The method of claim 16, wherein the computer system exits from the first low power state in response to an exit condition, and wherein the method further comprises the step of:
   generating a second synchronous refresh cycle based off said synchronous clock in response to said exit condition.

18. The method of claim 17, wherein said second synchronous refresh cycle is generated only if an asynchronous refresh cycle is not in progress when said exit condition occurs.

19. The method of claim 15, wherein the computer system includes a real time clock, and wherein the asynchronous clock is provided by said real time clock.

20. The method of claim 15, wherein the memory device receives row address strobe and column address strobe signals, and wherein said periodic refresh generating step includes the steps of:
   maintaining said column address strobe signals asserted while the computer system is in the first low power state; and
   pulsing said row address strobe signals periodically to generate CAS-before-RAS refresh cycles while the computer system is in the first low power state, said row address strobe signals being based off the asynchronous clock.

21. The method of claim 15, wherein the computer system has a second low power state which is a lower power consumption state than the first low power state, wherein the asynchronous clock is disabled in said second low power state, and wherein said asynchronous refresh generating step continues to generate said periodic refresh cycles based off said asynchronous clock while the computer system is in said second lower power state.

22. A circuit for generating refresh cycles to a memory device in a computer system, the computer system having a memory controller coupled to the memory device, an asynchronous clock and a synchronous clock, and at least a first low power state, the circuit comprising:

a first low power state logic detecting if the computer system is in the first low power state;

memory controller state logic coupled to the first low power state logic for disabling the memory controller if the computer system is in the first low power state, wherein the memory controller includes a normal power refresh generator receiving of the synchronous clock for generating periodic refresh signals based off the synchronous clock while the computer system is not in a low power state; and asynchronous low power refresh logic coupled to the first low power state logic receiving the asynchronous clock for generating periodic refresh cycles based off the asynchronous clock while the computer system is in the first low power state.

23. The circuit of claim 22, further comprising:

synchronous low power refresh logic coupled to the first low power state control logic and receiving the synchronous clock for generating a first synchronous refresh cycle before enabling the asynchronous low power refresh logic after the computer system transitions to the first low power state.

24. The circuit of claim 23, wherein the computer system exits from the first low power state in response to an exit condition and wherein the synchronous low power refresh logic generates a second synchronous refresh cycle based off the synchronous clock in response to the exit condition.

25. The circuit of claim 24, wherein the second synchronous refresh cycle is generated only if an asynchronous refresh cycle is not in progress when the exit condition occurs.

26. The circuit of claim 22, wherein the computer system includes a real time clock, and wherein the asynchronous clocks provided by the real time clock.

27. The circuit of claim 22, wherein the memory device receives row address strobe signals, and wherein the asynchronous low power refresh logic comprises:

column address strobe logic for maintaining column address strobe signals asserted while the computer system is in the first low power state; and row address strobe logic for pulsing the row address strobe signals periodically to generate CAS-before-RAS refresh cycles while the computer system is in the first low power state, the row address strobe signals being based off the asynchronous clock.

28. The circuit of claim 22, wherein the computer system has a second low power state which is a lower power consumption state from the first low power state, wherein the synchronous clock is disabled in the second low power state, and wherein the asynchronous low power refresh logic continues to generate the periodic refresh cycles based off the asynchronous clock while the computer system is in the second low power state.

29. A computer system having at least a first low power state, an asynchronous clock and a synchronous clock, comprising:

a memory device;

a memory controller coupled to the memory device, wherein the memory controller includes a normal power refresh generator means a first low power state for detecting receiving the synchronous clock for generating periodic refresh cycles based off the synchronous clock while the computer is not in a low power state; and a low power refresh controller coupled to the memory device and memory controller, comprising:

first low power state logic for detecting if the computer system is in the first low power state;

memory controller state logic coupled to the first low power state logic for disabling the memory controller if the computer system is in the low power state; and asynchronous low power refresh logic to the first low power state logic and receiving the asynchronous clock for generating periodic refresh cycles to the memory device based off the asynchronous clock while the computer system is in the first low power state.

30. The computer system of claim 29, wherein the low power refresh controller further comprises:

synchronous low power refresh logic coupled to the first low power state logic and receiving the synchronous clock for generating a first synchronous refresh cycle before enabling the asynchronous refresh generating means after the computer system transitions to the first low power state.

31. The computer system of claim 30, wherein the computer system exits from the first low power state in response to an exit condition, and wherein the synchronous low power refresh logic generates a second synchronous refresh cycle based off the synchronous clock in response to the exit condition.

32. The computer system of claim 31, wherein the second synchronous refresh cycle is generated only if an asynchronous refresh cycle is not in progress when the exit condition occurs.

33. The computer system of claim 29, further comprising:

a real time clock providing the asynchronous clock.

34. The computer system of claim 29, wherein the memory device receives row address strobe and column address strobe signals, and wherein the asynchronous low power refresh logic includes:

column address strobe logic for maintaining the column address strobe signals asserted while the computer system is in the first low power state; and row address strobe logic for pulsing the row address strobe signals periodically to generate CAS-before-RAS refresh cycles while the computer system is in the first low power state, the row address strobe signals being based off the asynchronous clock.

35. The computer system of claim 29, wherein the computer system has a second low power state which is a lower power consumption state than the first low power state, wherein the synchronous clock is disabled in the second low power state, and wherein the asynchronous low power refresh logic continues to generate the periodic refresh cycles based off the asynchronous clock while the computer system is in the second lower power state.

* * * * *